(12) United States Patent
Foody et al.

(10) Patent No.: US 12,515,167 B2
(45) Date of Patent: Jan. 6, 2026

(54) PURIFICATION OF METHANE CONTAINING GAS STREAMS USING SELECTIVE MEMBRANE SEPARATION

(71) Applicant: Iogen Corporation, Ottawa (CA)

(72) Inventors: Brian Foody, Ottawa (CA); Jeffrey S. Tolan, Ottawa (CA)

(73) Assignee: Iogen Corporation, Ottawa (CA)

( * ) Notice: Subject to any disclaimer, the term of this patent is extended or adjusted under 35 U.S.C. 154(b) by 297 days.

(21) Appl. No.: 18/547,612

(22) PCT Filed: Mar. 15, 2022

(86) PCT No.: PCT/CA2022/050390
§ 371 (c)(1),
(2) Date: Aug. 23, 2023

(87) PCT Pub. No.: WO2022/193007
PCT Pub. Date: Sep. 22, 2022

(65) Prior Publication Data
US 2024/0131469 A1  Apr. 25, 2024
US 2024/0226801 A9  Jul. 11, 2024

Related U.S. Application Data

(60) Provisional application No. 63/162,868, filed on Mar. 18, 2021.

(51) Int. Cl.
*B01D 53/22* (2006.01)
*B01D 53/62* (2006.01)

(52) U.S. Cl.
CPC .......... *B01D 53/226* (2013.01); *B01D 53/227* (2013.01); *B01D 53/62* (2013.01);
(Continued)

(58) Field of Classification Search
CPC ............ B01D 2256/245; B01D 53/226; B01D 53/227; B01D 2257/102; B01D 2257/504;
(Continued)

(56) References Cited

U.S. PATENT DOCUMENTS 7,537,641 B2  5/2009  Lokhandwala et al.
8,658,026 B2  2/2014  Foody et al.
(Continued)

FOREIGN PATENT DOCUMENTS

WO  WO 2020/041857  3/2020
WO  WO 2022/193007  9/2022

OTHER PUBLICATIONS

Samei, M. et al. "Multi-stage gas separation process for separation of carbon dioxide from methane: Modeling, simulation, and economic analysis", Chemical Engineering & Processing—Process Intensification, Oct. 2021, vol. 170, in 14 pages.
(Continued)

*Primary Examiner* — Robert Clemente
(74) *Attorney, Agent, or Firm* — Knobbe, Martens, Olson & Bear, LLP

(57) ABSTRACT

A process and/or system for processing a pressurized gas mixture by membrane separation. Portions of the pressurized gas mixture are withdrawn and provided as a plurality of pressurized gas streams at successively lower pressures. Each portion, provided as a respective pressurized gas stream, is provided for processing in a respective membrane system, each of which is at a different pressure level. Partially purified streams produced by one or more membrane systems are provided for processing at lower pressure levels (e.g., where they are combined with one of the pressurized gas streams). Accordingly, costs associated with recycle compression are reduced and/or eliminated.

23 Claims, 18 Drawing Sheets

(52) U.S. Cl.
CPC .. *B01D 2256/245* (2013.01); *B01D 2257/102* (2013.01); *B01D 2257/504* (2013.01); *B01D 2258/05* (2013.01); *C10L 2290/548* (2013.01)

(58) Field of Classification Search
CPC .... B01D 2258/05; B01D 53/62; B01D 53/22; C10L 2290/26; C10L 2290/46; C10L 2290/548; C01L 3/104; C01L 3/105
See application file for complete search history.

(56) References Cited

U.S. PATENT DOCUMENTS

| | | |
|---|---|---|
| 8,753,854 B2 | 6/2014 | Foody |
| 8,945,373 B2 | 2/2015 | Foody |
| 9,040,271 B2 | 5/2015 | Foody |
| 10,093,540 B2 | 10/2018 | Foody |
| 10,421,663 B2 | 9/2019 | Foody |
| 10,760,024 B2 | 9/2020 | Foody et al. |

OTHER PUBLICATIONS

International Search Report and Written Opinion mailed Apr. 27, 2022 for PCT Application No. PCT/CA2022/050390, filed Mar. 15, 2022.

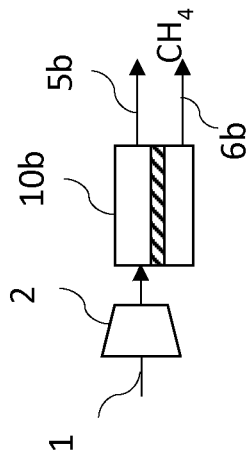
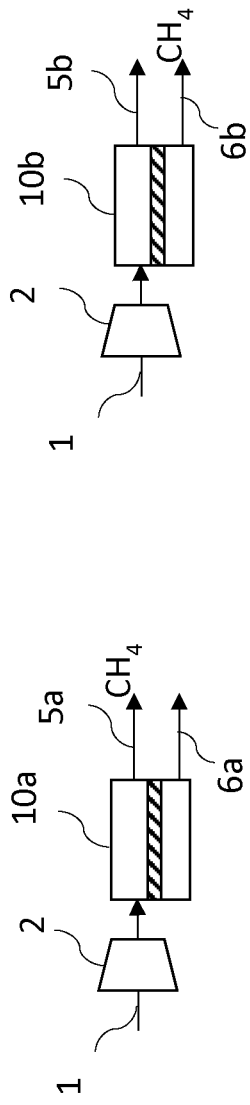
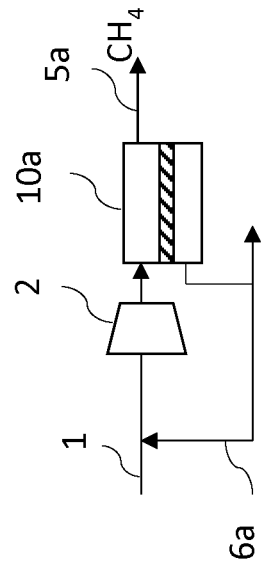

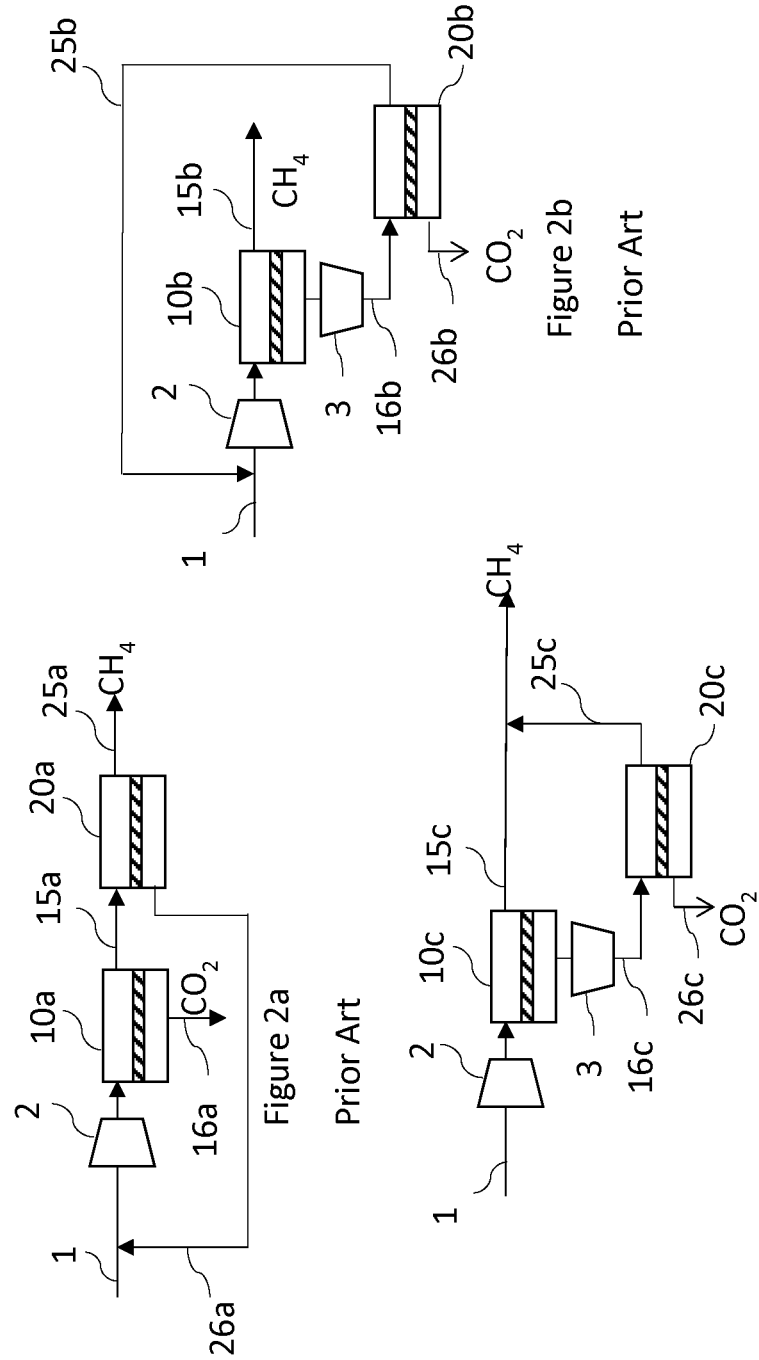

PURIFICATION OF METHANE CONTAINING GAS STREAMS USING SELECTIVE MEMBRANE SEPARATION

TECHNICAL FIELD

The present disclosure relates generally to a system and/or method for separating one or more components from a gas mixture using membrane separation, and in particular, to a system and/or method for separating one or more components from a gas mixture wherein the gas mixture is split into multiple pressurized gas streams provided at successively lower pressures (e.g., stepped down in pressure).

BACKGROUND

Many gases contain one or more components that can be separated from other components in the gas (e.g., to remove contaminants from the mixture and/or recover components of value). For example, one such gas is biogas, which can be produced from the anaerobic digestion of organic matter. Another such gas is natural gas from well production. In each of these examples, the gas obtained from the source (e.g., raw biogas or raw natural gas) includes methane ($CH_4$) and may contain one or more other components such as carbon dioxide ($CO_2$) and/or nitrogen ($N_2$), which can reduce the heating value of the gas relative to pure methane. Separating non-methane components, such as $CO_2$ and/or $N_2$ from the $CH_4$ can improve the heating value of the gas mixture and/or can provide a gas that is predominately $CH_4$ and is suitable for injection into a commercial natural gas (NG) distribution system.

One approach to separate one or more components from other components in a gas mixture is membrane separation. The principle behind membrane separation is based on different molecules having different rates of permeation ("permeability") through a membrane. More specifically, some molecules readily pass through the membrane (i.e., to the permeate side), while other molecules do not readily pass through the membrane (e.g., pass through the membrane more slowly) and stay on the feed side (i.e., on the retentate side). The driving force behind this process is a difference in partial pressure, that is, the concentration multiplied by the pressure. The gas molecules move from the side of higher partial pressure to lower partial pressure. In practice, the pressure (and partial pressure) is higher on the retentate side than the permeate side, typically by compressing the feed stream and/or drawing a vacuum on the permeate side.

Membrane separations for biogas and/or natural gas can be aimed at providing a $CO_2/CH_4$ separation and/or a $N_2/CH_4$ separation. For example, membranes designed to provide a $CO_2/CH_4$ separation can be used to upgrade biogas, which can have a $CO_2$ content in excess of 40%, in order to produce renewable natural gas (RNG). Such membranes are often selectively permeable to $CO_2$ over $CH_4$ (i.e., $CO_2$-selective). Membranes designed to provide a $N_2/CH_4$ separation can be used to reject $N_2$ from biogas or raw natural gas (e.g., after the bulk removal of $CO_2$) in order to ensure the gas meets applicable specifications. Such membranes can be selectively permeable to $CH_4$ over $N_2$ (i.e., $CH_4$-selective) or selectively permeable to $N_2$ over $CH_4$ (i.e., $N_2$-selective). In general, $N_2/CH_4$ separations can be more challenging than $CO_2/CH_4$ separations due to some similarities between $CH_4$ and $N_2$.

Referring to FIG. 1a, there is shown an embodiment of a membrane separation wherein the membrane 10a is selectively permeable to $CO_2$ over $CH_4$. Accordingly, when a binary gas mixture containing $CH_4$ and $CO_2$ is provided as a feed stream 1 and is passed over the membrane, the system provides a retentate 5a that is enriched in $CH_4$ and a permeate 6a that is depleted in $CH_4$ and/or enriched in $CO_2$. Referring to FIG. 1b, there is shown an embodiment of a membrane separation wherein the membrane 10b is selectively permeable to $CH_4$ over $N_2$. Accordingly, when a binary gas mixture containing $CH_4$ and $N_2$ is provided as a feed stream 1 and is passed over the membrane, the system provides a retentate 5b that is depleted in $CH_4$ and/or enriched in $N_2$ and a permeate 6b that is enriched in $CH_4$.

One challenge in membrane separations for gas mixtures is meeting targets for product gas purity and product gas recovery. Membrane systems based on only one membrane stage (e.g., the single stage membrane separations illustrated in in FIGS. 1a and 1b), often cannot meet both product purity requirements (e.g., a $CH_4$ content of >95%) and product recovery requirements (e.g., most of the $CH_4$ recovered) required for product specifications, environmental regulations, and/or economic viability. In order to enhance product recovery, the membrane separation can employ recycle (e.g., see FIG. 1c where the permeate 6a is at least partially recycled to enhance $CH_4$ recovery) and/or a multistage configuration.

Numerous multistage configurations have been proposed for upgrading biogas and/or natural gas. Referring to FIGS. 2a-2c, there is shown various two stage membrane separations for upgrading biogas predominately containing $CH_4$ and $CO_2$, wherein each membrane is $CO_2$-selective. In each configuration, a first stage 10a-c produces a first retentate 15a-c enriched in $CH_4$ and a first permeate 16a-c depleted in $CH_4$ and/or enriched in $CO_2$, and a second stage 20a-c produces a second retentate 25a-c enriched in $CH_4$ and a second permeate 26a-c depleted in $CH_4$ and/or enriched in $CO_2$. Of these three configurations, the configuration in FIG. 2b, may be expected to offer the lowest biogas upgrading costs as well as the highest $CH_4$ recovery.

FIG. 2d shows an embodiment of a two stage membrane separation, wherein a $CH_4$-selective membrane is used for rejecting $N_2$. In a non-limiting example, a feed gas containing ~8-12% $N_2$ is compressed to 200 psia (1.4 MPa) and is fed to the first stage 10d that produces a first permeate 16d enriched in $CH_4$ (e.g., ~6% $N_2$) and a first retentate 15d, which is fed to the second stage 20d. The second stage 20d produces a retentate 25d depleted in $CH_4$ and/or enriched in $N_2$ (e.g., ~40% $N_2$) and a permeate 26d enriched in $CH_4$ and/or depleted in $N_2$ (e.g., ~10-20% $N_2$), which is recycled back as feed to the first stage.

FIG. 2e shows an embodiment of a three stage membrane system, wherein a $CH_4$-selective membrane is used for rejecting $N_2$ from biogas (e.g., after the bulk removal of $CO_2$ and other non-methane components). This three stage system includes a first stage 10e, a second stage 20e, and a third stage 30e. In a non-limiting example, the second retentate 25e (~11% $N_2$, ~89% $CH_4$) and the third permeate 36e (~13% $N_2$, — 86% $CH_4$), each at 150 psig (1 MPa), are combined with a feed gas (~8% $N_2$, ~90% $CH_4$) to provide a combined stream (~10% $N_2$, ~88% $CH_4$), which is fed to a compressor 2 where it is compressed to 500 psig (3.4 MPa). The combined stream is separated into the first retentate 15e, which is enriched in $N_2$ (~16% $N_2$, ~83% $CH_4$), and the first permeate 16e, which is enriched in $CH_4$ (~6% ~93% $CH_4$). The first permeate 16e is fed to the second stage 20e, which produces the second permeate 26e that is compressed 5 and provided as a product stream (~3% $N_2$, ~95% $CH_4$). The retentate 35e has a $N_2$ content of 63%.

While membrane separations that use multistage and/or recycling configurations can increase $CH_4$ recovery and/or generally reduce upgrading costs, such configurations are typically associated with increased compression costs (e.g., capital and/or operational). More specifically, whenever a permeate stream, or a stream derived therefrom, is recycled back to the start of a membrane separation, additional compression costs may be incurred. For example, such costs can correspond to an increased size of the feed compressor 2 and/or the use of an interstage compressor 3. Even in configurations where the feed pressure is sufficiently high to obviate the need for a feed compressor, a recycle compressor (not shown) is typically required to increase the pressure of the recycle stream, which is relatively low as a result of the pressure drop across one or more membranes, prior to being combined with the incoming feed stream. The recycle of gas streams also increases the gas flow rate, thereby increasing the membrane area required for the separation, and the associated costs.

SUMMARY

The present disclosure recognizes that some gas mixtures can be provided at relatively high pressures (e.g., natural gas from a wellhead, or raw or partially purified biogas transported as a compressed gas), and that this relatively high pressure can be exploited to not only reduce feed compression costs and/or interstage compression costs, but also reduce, minimize, or eliminate recycle compression costs (e.g., recompression costs). In particular, the present disclosure recognizes that membrane separations utilizing recycle (e.g., where a process stream is returned to a previous stage in the membrane separation) often use compression to facilitate the upstream recycling (e.g., to increase a pressure of a permeate, and/or a stream derived therefrom, in order to bring the pressure of the recycled gas up to the feed pressure of the upstream stage), and that these recompression costs can be reduced, minimized, and/or eliminated when the pressurized gas mixture is split into multiple fresh feed streams provided at successively lower pressures (e.g., stepped down in pressure), where each of the fresh feed streams is fed for processing in a separate membrane system, and where permeate and/or retentate produced by each of the membrane systems is not recycled upstream, but rather is combined with fresh feed for another membrane system operating at a relatively low pressure (i.e., relative to the feed pressure of the membrane system that produced the permeate and/or retentate).

In accordance with one aspect of the instant invention there is provided a method of separating a gas mixture, the method comprising: a) providing a pressurized gas mixture, the pressurized gas mixture comprising methane and at least one non-methane component; b) withdrawing portions of the pressurized gas mixture and providing the portions as a plurality of pressurized gas streams at successively lower pressures, each portion provided as a respective pressurized gas stream; c) providing a plurality of membrane systems at successively lower pressure levels, each membrane system in the plurality of membrane systems comprising at least one stage and configured to provide at least two streams, the at least two streams chosen from a product stream, an off-gas stream, and a partially purified stream; d) processing feed in each membrane system provided in (c), wherein the feed for each membrane system provided in (c) comprises gas from a respective pressurized gas stream in the plurality of pressurized gas streams, and wherein the feed for at least one membrane system provided in (c) further comprises gas from a partially purified stream produced from one of the membrane systems provided in (c) that is at a higher pressure level than the at least one membrane system; e) providing a product gas from at least one product stream produced from the plurality of membrane systems.

In accordance with one aspect of the instant invention there is provided a system for separating a gas mixture, the system comprising: a) at least one system inlet configured to receive a pressurized gas mixture from a pressurized vessel, the pressurized gas mixture comprising biogas; b) a feed system, the feed system in fluid communication with the at least one system inlet and configured to provide a plurality of pressurized streams of the biogas at successively lower pressures; c) a plurality of membrane systems having successively lower feed pressures, each membrane system comprising at least one stage and configured to receive gas from a respective one of the pressurized gas streams, each membrane system in the plurality of membrane systems configured to provide at least two streams, the at least two streams chosen from a product stream, an off-gas stream, and a partially purified stream; d) a pipe system for providing feed for each membrane system in the plurality of membrane systems, the pipe system configured to provide gas from at least one partially purified stream produced from the plurality of membrane systems for processing in one of the membrane systems in (c) having a lower feed pressure than the membrane system that produced that partially purified stream; and, e) at least one system outlet for providing a product gas from at least one product stream produced from the plurality of membrane systems.

In accordance with one aspect of the instant invention there is provided a method of upgrading biogas, the method comprising: a) providing at least one pressure vessel, each pressure vessel containing biogas at a pressure of at least 1000 psig, the biogas comprising methane and a non-methane component; b) withdrawing portions of the biogas from the at least one pressure vessel, thereby depressurizing the at least one pressure vessel, and providing each portion as a pressurized gas stream at a different pressure, thereby providing a plurality of pressurized gas streams at successively decreasing pressures; c) providing a plurality of membrane systems, each membrane system in the plurality of membrane systems at a different pressure level and configured to provide at least two streams, the at least two streams chosen from a product stream, an off-gas stream, and a partially purified stream; d) feeding a first pressurized gas stream from the plurality of pressurized gas streams to a first a membrane system from the plurality of membrane systems, the first membrane system at a first pressure level and producing a first permeate; e) feeding a combined stream to a second membrane system in the plurality of membrane systems, the second membrane system at a second pressure level and producing a second permeate, the second pressure level lower than the first pressure level, the combined stream produced by combining a second pressurized gas stream from the plurality of pressurized gas streams with the first permeate or a stream derived from the first permeate, wherein the second pressurized gas stream is at a lower pressure than the first pressurized gas stream; and f) providing a product gas from at least one product stream produced from the plurality of membrane systems.

In accordance with one aspect of the instant invention there is provided a method of separating a gas mixture, the method comprising: a) providing a pressurized gas mixture, the pressurized gas mixture comprising methane and at least one non-methane component; b) providing a plurality of pressurized gas streams at successively lower pressures, each pressurized gas stream comprising a portion of the pressurized gas mixture; c) providing a plurality of membrane systems at successively lower pressure levels, each membrane system in the plurality of membrane systems comprising at least one stage and configured to provide at least two streams, the at least two streams chosen from a product stream, an off-gas stream, and a partially purified stream; d) providing a plurality of feed streams to the plurality of membrane systems, each feed stream in the plurality of feed streams comprising gas from a respective pressurized gas stream in the plurality of gas streams, at least one of the feed streams in the plurality of feed streams produced by combining one of the pressurized gas streams with at least one of permeate or retentate from a membrane system provided in (c) that is at a higher pressure level than the membrane system to which it is fed; and e) providing a product gas from at least one product stream produced from the plurality of membrane systems.

BRIEF DESCRIPTION OF THE DRAWINGS

FIG. 1a is a schematic diagram of a single stage membrane separation using feed compression, where the membrane is selective to carbon dioxide;

FIG. 1B is a schematic diagram of a single stage membrane separation using feed compression, where the membrane is selective to methane;

FIG. 1c is a schematic diagram of a single stage membrane separation using recycle and feed compression, where the permeate is at least partially recycled to recover methane lost to the permeate;

FIG. 2a is a schematic diagram of a two stage membrane separation using recycle and feed compression, wherein the membrane is selective to carbon dioxide;

FIG. 2b is a schematic diagram of another two stage membrane separation using recycle and feed compression, wherein the membrane is selective to carbon dioxide FIG. 2c is a schematic diagram of another two stage membrane separation system, wherein the membrane is selective to carbon dioxide;

DETAILED DESCRIPTION

Figure 2D:
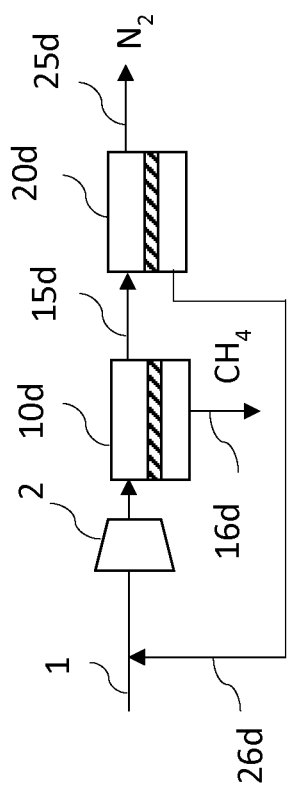
FIG. 2d is a schematic diagram of a two stage membrane separation using recycle and feed compression, wherein the membrane is selective to methane.
Figure 2E:
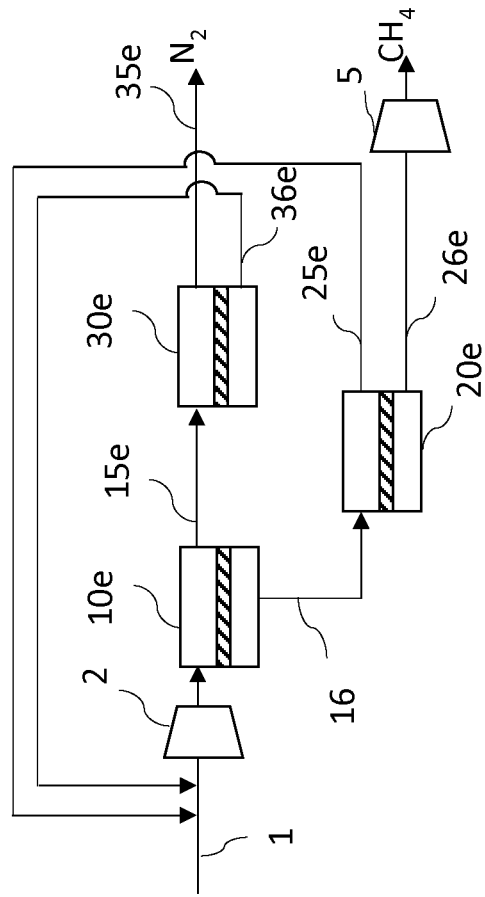
FIG. 2e is a schematic diagram of a three stage membrane separation using recycle and feed compression, wherein the membrane is selective to methane.

Certain exemplary embodiments of the invention now will be described in more detail, with reference to the drawings, in which like features are identified by like reference numerals. The invention may, however, be embodied in many different forms and should not be construed as limited to the embodiments set forth herein.

The terminology used herein is for the purpose of describing certain embodiments only and is not intended to be limiting of the invention. For example, as used herein, the singular forms "a," "an," and "the" may include plural references unless the context clearly dictates otherwise. The terms "comprises", "comprising", "including", and/or "includes", as used herein, are intended to mean "including but not limited to." The term "and/or", as used herein, is intended to refer to either or both of the elements so conjoined. The phrase "at least one" in reference to a list of one or more elements, is intended to refer to at least one element selected from any one or more of the elements in the list of elements, but not necessarily including at least one of each and every element specifically listed within the list of elements. Thus, as a non-limiting example, the phrase "at least one of A and B" may refer to at least one A with no B present, at least one B with no A present, or at least one A and at least one B in combination. In the context of describing the combining of components by the "addition" or "adding" of one component to another, or the separating of components by the "removal" or "removing" of one component from another, those skilled in the art will understand that the order of addition/removal is not critical (unless stated otherwise). The terms "remove", "removing", "removal", "separating", with reference to one or more impurities, contaminants, and/or components of biogas, includes partial removal and/or separation. The terms "cause" or "causing", as used herein, may include arranging or bringing about a specific result (e.g., a withdrawal of a gas), either directly or indirectly, or to play a role in a series of activities through commercial arrangements such as a written agreement, verbal agreement, or contract. The term "associated with", as used herein with reference to two elements (e.g., a fuel credit associated with a transportation fuel), is intended to refer to the two elements being connected with each other, linked to each other, related in some way, dependent upon each other in some way, and/or in some relationship with each other. The terms "first", "second", etc., may be used to distinguish one element from another, and these elements should not be limited by these terms. The term "plurality", as used herein, refers to two or more. The term "providing" as used herein with respect to an element, refers to directly or indirectly obtaining the element and/or making the element available for use. Unless defined otherwise, all technical and scientific terms used herein have the same meanings as commonly understood by one of ordinary skill in the art.

The term "biogas", as used herein, refers to a gas mixture that contains $CH_4$ produced from biomass. While biogas is predominately produced the anaerobic digestion (AD) of organic material, it is also possible to produce biogas from the gasification of biomass. For example, the gasification of biomass may produce syngas, which may be cleaned up, methanated, and separated into methane and carbon dioxide. The term biogas encompasses raw biogas, partially purified biogas, and renewable natural gas (RNG), unless otherwise specified.

The term "raw biogas", as used herein, refers to biogas as obtained from its source (e.g., anaerobic digester or landfill) before it is treated to remove any chemical components (e.g., $CO_2$, $H_2O$, $N_2$, hydrogen sulfide ($H_2S$), ammonia ($NH_3$), oxygen ($O_2$), volatile organic compounds (VOCs), and/or siloxanes).

The term "partially purified biogas", as used herein, refers to biogas that has been treated to remove one or more non-methane components (e.g., $CO_2$, $H_2S$, $H_2O$, $N_2$, $NH_3$, $O_2$, VOCs, and/or siloxanes), but requires further treatment in order to meet pipeline specifications (e.g., it may contain one or more non-methane components in an amount that causes it to fall short of meeting natural gas pipeline specifications).

The term "renewable natural gas" or "RNG", as used herein, refers to biogas that has been upgraded to meet or exceed applicable natural gas pipeline specifications, meet or exceed applicable quality specifications for vehicle use (e.g., CNG specifications), and/or natural gas (NG) withdrawn from a NG distribution system that is associated with the environmental attributes of biogas injected into the NG distribution system (e.g., a gas that qualifies as RNG under applicable regulations). Pipeline specifications include specifications required for biogas for injection into a natural gas commercial distribution system. Pipeline quality standards or specifications may vary by region and/or country in terms of value and units. For example, pipelines standards may require the RNG to have a $CH_4$ level that is at least 95% or have a heating value of at least 950 BTU/scf. The percentages used to quantify gas composition and/or a specific gas content, as used herein, are expressed as mol %, unless otherwise specified. More specifically, they are expressed by mole fraction at standard temperature and pressure (STP), which is equivalent to volume fraction.

The term "natural gas" or "NG", as used herein, refers a mixture rich in hydrocarbon that is gaseous at standard temperatures and pressures, where the primary component is $CH_4$. The term natural gas or NG can encompass raw biogas, partially purified biogas, and/or RNG.

The term "environmental attributes", as used herein with regard to a specific material (e.g., biogas), refers to any and all attributes related to the material, including all rights, credits, benefits, or payments associated with the renewable nature of the material and/or the reduction in or avoidance of fossil fuel consumption or reduction in lifecycle greenhouse gas emissions associated with the use of the material. Some non-limiting examples of environmental attributes include verified emission reductions, voluntary emission reductions, offsets, allowances, credits, avoided compliance costs, emission rights and authorizations, certificates, voluntary carbon units, under any law or regulation, or any emission reduction registry, trading system, or reporting or reduction program for greenhouse gas emissions that is established, certified, maintained, or recognized by any international, governmental, or nongovernmental agency.

Figure 3A:
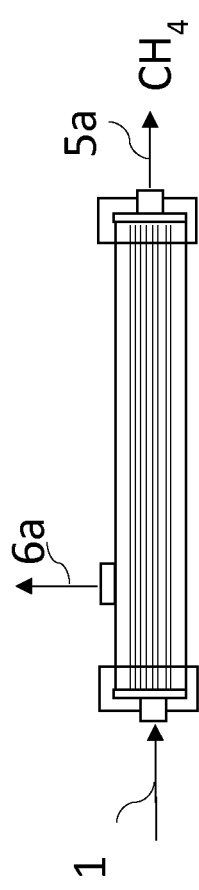
FIG. 3a is a schematic diagram illustrating a membrane canister.

The term "membrane", as used herein, refers a selective barrier that preferentially passes one or more components of a gas mixture therethrough while preferentially retaining other components of the gas mixture. Membranes can have any suitable geometry (e.g., tubular or flat sheet) and can be packaged according to any suitable configuration (e.g., plate-and-frame, hollow fiber, tubular, or spiral wound). One or more membranes are often packaged in a canister (e.g., a cylindrical pressure casing) having a single feed inlet, a single retentate outlet, and a single permeate outlet. For example, FIG. 3a is a schematic diagram of a canister containing a hollow fiber bundle.

The term "permeate", as used herein, refers to the gas that has passed through the membrane.

The term "retentate", as used herein, refers to the gas that does not pass through the membrane (i.e., is retained).

The term "transmembrane pressure", as used herein, refers to the pressure drop between the feed and permeate sides of the membrane.

The term "membrane separation", as used herein, refers to a process by which a gas mixture is separated using one or more membrane (e.g., on the basis of different permeabilities of individual components of the gas mixture across the membrane).

The term "membrane system", as used herein, refers to a system that includes one or more membranes that work together to achieve a given membrane separation for a given incoming feed. The term membrane system encompasses the one or more membranes, as well as equipment necessary for the satisfactory operation of the membrane system (e.g., piping, compressors, valves, instruments, controls etc.). A membrane system, and/or the membrane separation performed using that membrane system, can have one or more stages.

Figure 3B:
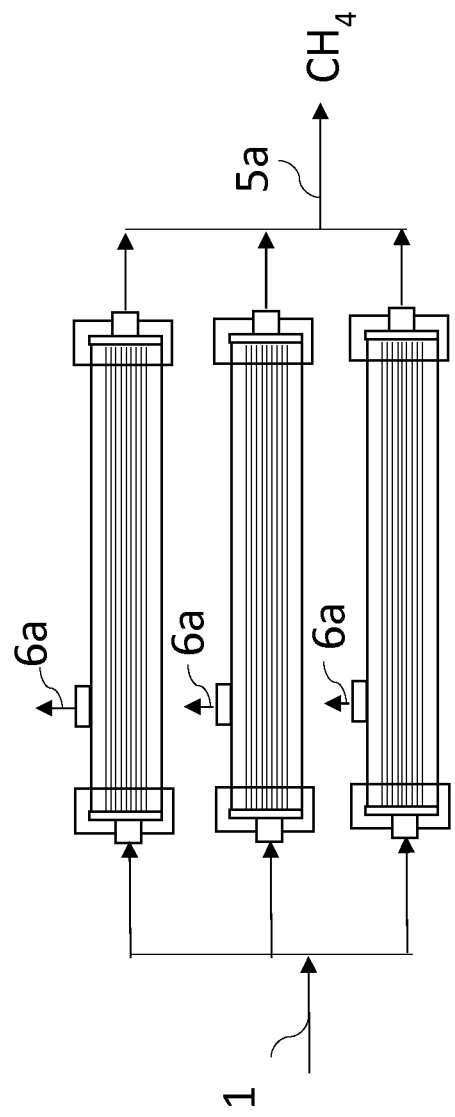
FIG. 3b is a schematic diagram illustrating a single stage membrane system provided as a plurality of membrane canisters connected in parallel.

The terms "stage" or "membrane stage", as used herein, refers to a unit and/or a membrane separation performed using that unit, wherein substantially all of the membranes associated therewith function the same way for the same purpose (e.g., all of the membranes associated with one stage provide retentate having substantially the same composition and permeate having substantially the same composition). For example, each membrane stage can be provided by a bank of canisters, wherein the canisters are arranged in parallel such that a portion of an incoming feed is fed into each of the canisters, and such that the retentate produced from the plurality of canisters is combined and provided from a single retentate outlet, while the permeate produced from the plurality of canisters is combined and provided from a single permeate outlet (e.g., FIG. 3b).

The term "multistage", as used herein, refers to a membrane system, or membrane separation performed using the membrane system, that has at least two stages, wherein the permeate of one stage feeds into another stage (e.g., cascade arrangement) and/or the retentate of one stage feeds into another stage (e.g., series arrangement).

The term "product stream", as used herein, refers to a stream containing permeate or retentate that is enriched in $CH_4$ and is output from a membrane system (i.e., is withdrawn from the separation process as a product). Typically, product streams are predominately $CH_4$ (e.g., have a $CH_4$ content of at least 70%, at least 75%, at least 80%, at least 85%, at least 90%, at least 92%, at least 94%, at least 95%, at least 96%, or at least 98%). Acceptable compositions of product steams can depend on product specifications (e.g., pipeline or transportation) and/or whether the product stream will be subject to further purification (e.g., other than membrane). The product stream from one membrane system can be pooled with one or more product streams from other membrane systems.

The term "off-gas stream", as used herein, refers to a stream containing permeate or retentate that is depleted in $CH_4$ and/or enriched in one or more non-methane components (e.g., $CO_2$ and/or $N_2$) and is output from a membrane system. For example, an off-gas stream may contain less than about 60% $CH_4$ and/or contain more than 30% of at least one non-methane component. Depending on its composition, an off-gas stream can be discharged to the atmosphere, can be treated for discharge to the atmosphere (e.g., flared to remove excess $CH_4$), can be reused within the process (e.g., recycled or combusted for process heat and/or electricity), or can be provided as a value-added product. For example, with regard to the latter a plurality of off-gas streams that are predominately $CO_2$ can be pooled and provided for sequestration.

The term "partially purified stream", as used herein, refers generally to a stream comprising permeate and/or or retentate from a membrane system that contains a sufficient amount of $CH_4$ to warrant further purification by membrane separation based on the intended product (e.g., in order to recover more $CH_4$ and/or further purify an off-gas). When a membrane system produces an off-gas stream, a product stream, and a partially purified stream, the partially purified stream will have a $CH_4$ content that is higher than the off-gas stream but lower than the product stream.

The term "enriched in $CH_4$", as used herein with reference to a permeate or retentate stream, refers to the stream having a $CH_4$ content that is higher than the $CH_4$ content of the feed to the membrane stage that produced it.

The term "depleted in in $CH_4$", as used herein with reference to a permeate or retentate stream, refers to the stream having a $CH_4$ content that is lower than the $CH_4$ content of the feed to the membrane stage that produced it.

The term "stream", as used herein with reference to a gas, is interchangeable with the term "flow", and refers to a moving or still gas in a container (e.g., a vessel, a pipe, and/or processing equipment).

The term "substantially the same pressure", as used herein, refers to the pressure being within about 1% of the referenced pressure. For example, a stream having a pressure within the range from 1188 psig (8.2 MPa)-1212 psig (8.4 MPa) has substantially the same pressure as a stream having a pressure of 1200 psig (8.3 MPa).

The term "feed pressure", as used herein, refers to the pressure of gas fed into a membrane system or a stage of the membrane system (e.g., measured at the inlet).

The term "fresh feed", as used herein, refers to a gas mixture provided as feed for a membrane system that has not yet been processed by a membrane in the system.

The term "gas mixture", as used herein, refers to a mixture that contains a $CH_4$ component and one or more non-methane components (e.g., $CO_2$, and/or $N_2$) and is in the gas phase at atmospheric temperature and pressures. For example, in some embodiments, a pressurized gas mixture may be a supercritical gas mixture.

The term "biogas purity", as used herein, refers to the percentage of methane in the biogas expressed as a mole percent (e.g., 95% $CH_4$). The term "biogas recovery", as used herein, refers to the moles of methane recovered divided by the moles of methane originally in the biogas, and is often expressed as a percentage.

The terms "compressor" or "gas compressor", as used herein, refers to a unit for increasing the pressure of a gas by the application of work, and includes staged compressors and/or multiple compressors arranged in series, in parallel, or combinations thereof.

The instant disclosure relates to a method and/or system for a membrane separation wherein the membrane separation is conducted at a plurality of pressure levels and wherein a partially purified stream produced at one pressure level is provided for processing at a lower pressure level (e.g., successively lower). A general embodiment of the method and/or system is described with reference to FIGS. 4a and 4b.

In a first step 41, a pressurized gas mixture is provided. In general, the pressurized gas mixture (e.g., 49) can be obtained from any suitable source (e.g., pressurize vessel 40). In general, the source will provide a multicomponent gas, where the components include $CH_4$ and one or more non-methane components (e.g., the source gas can be raw natural gas, raw biogas, or partially purified biogas, where the non-methane components include $CO_2$ and/or $N_2$). Optionally, the pressurized gas has been processed (e.g., subjected to a cleaning and/or partial purification 48) in order to remove one or more components prior to the membrane separation (e.g., remove impurities that could complicate the membrane separation, foul the membrane, and/or negatively affect the product). In general, the pressure of the source may be substantially constant (e.g., source can be a natural gas wellhead) or the pressure of the source may fall as the pressurized gas mixture is withdrawn (e.g., source can be a vessel). In general, the initial pressure of the source will relatively high pressure (i.e., at least 600 psig (4.1 MPa), at least 800 psig (5.5 MPa), at least 900 psig (6.2

MPa), at least 1000 psig (6.9 MPa), at least 1200 psig (8.3 MPa), at least 1400 psig (9.6 MPa), at least 1600 psig (11.0 MPa), at least 1800 psig (12.4 MPa), at least 2000 psig (13.8 MPa), at least 2400 psig (16.5 MPa), at least 2600 psig (17.9 MPa), at least 2800 psig (19.3 MPa), at least 3000 psig (20.7 MPa), or at least 3600 psig (24.8 MPa)).

Figure 4A:
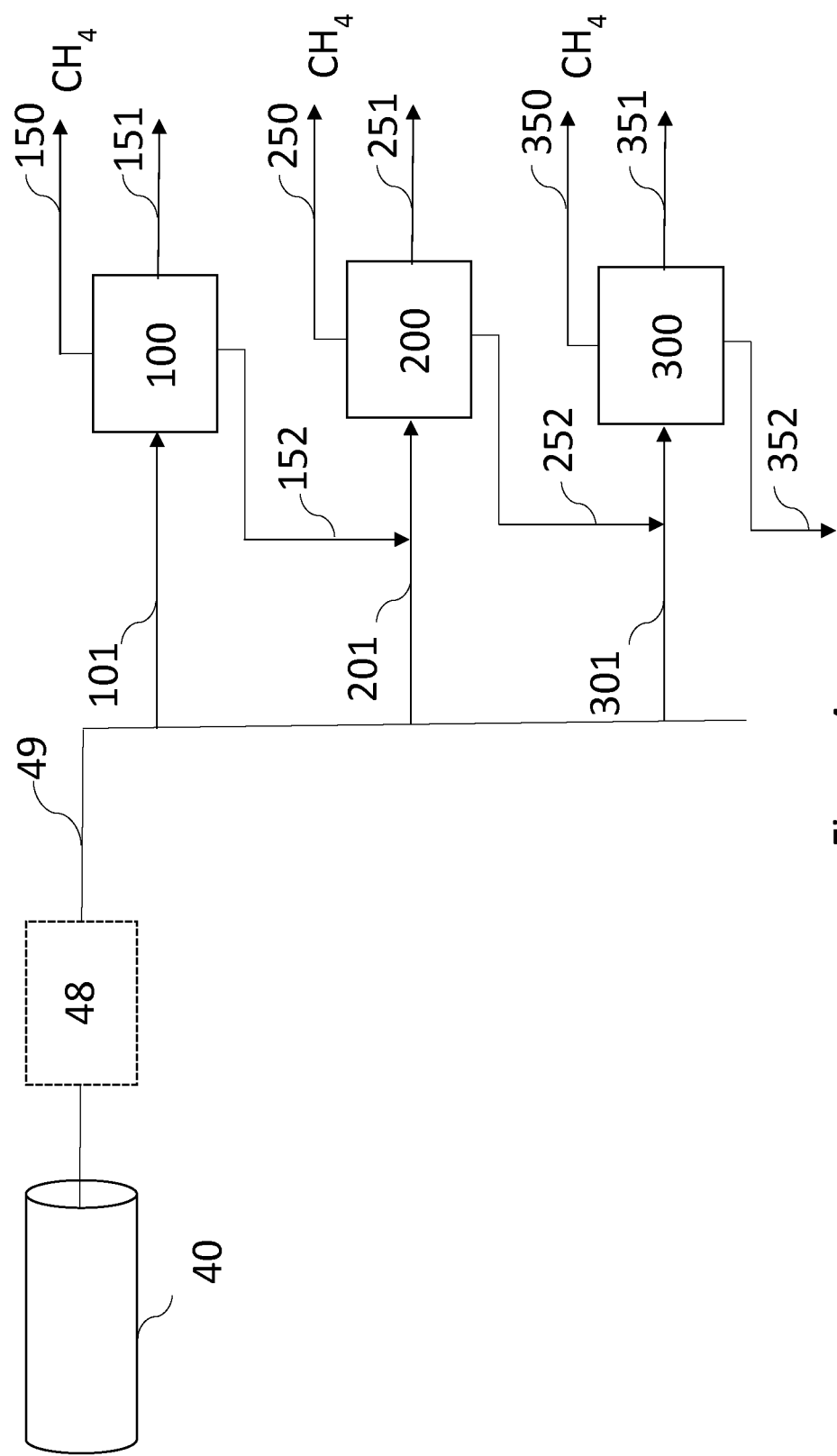
FIG. 4a is a schematic diagram of membrane separation in accordance with an embodiment of the instant invention.

In a second step 42, a plurality of aliquots of the pressurized gas mixture is withdrawn and is provided as a plurality of pressurized gas streams at successively lower pressures (i.e., each aliquot is provided as a respective pressurized gas stream, where each pressurized gas stream is at a different pressure). In general, this includes depressurizing at least a portion of the pressurized gas mixture. Referring to FIG. 4a, the pressurized gas mixture 49 is provided as pressurized gas streams 101, 201, 301 where the first pressurized gas stream 101 has a higher pressure than the second pressurized gas stream 201 and the third pressurized gas stream 301, and the second pressurized gas stream 201 has a higher pressure than the third pressurized gas stream 301. As will be understood by those skilled in the art, the pressurized gas mixture 49 and pressurized gas streams 101, 201, 301 are provided using any suitable apparatus (e.g., piping having suitable diameter) and can be provided at various flow rates (e.g., the aliquots are not necessarily equal in mass or volume).

In a third step 43, the pressurized gas streams are provided for processing in a plurality of membrane systems such that gas in each individual pressurized gas stream is provided for processing in a respective membrane system. In general, each membrane system in the plurality is associated with a different pressure level (e.g., the plurality of membrane systems has successively lower feed pressures and is arranged such that each membrane system receives fresh feed at a different pressure). Referring to FIG. 4a, the first pressurized gas stream 101 is provided for processing in the first membrane system 100, the second pressurized gas stream 201 is provided for processing in the second membrane system 200, and the third pressurized gas stream 301 is provided for processing in the third membrane system 300. Each membrane system (e.g., 100, 200, 300, etc.) is a single stage or multi-stage membrane system that produces: (1) a partially purified stream (e.g., 152, 252, 352, etc.), (2) a product stream that is predominately $CH_4$ (e.g., 150, 250, 350, etc.), and/or (3) an off-gas stream (e.g., 151, 251, 351, etc.). Preferably, each membrane system produces at least two of these streams (e.g., a product stream and a partially purified stream or an off-gas stream and a partially purified stream or a product stream and an off-gas stream). Depending on the expected composition of the pressurized gas stream (e.g., 49) each membrane system may be configured to provide a $CO_2/CH_4$ separation, a $CH_4/N_2$ separation, and/or another separation. In each case, the membranes may also separate other components (e.g., a membrane providing a $CO_2/CH_4$ separation may remove $CO_2$, $H_2S$, and/or $H_2O$ from the gas mixture). Various non-limiting embodiments of membrane configurations that may be suitable are discussed below and/or illustrated in FIGS. 5a, 5b, 6, 7, 8a, 8b, and 9.

In a fourth step 44, one or more of the partially purified streams produced by the plurality of membrane systems is/are provided for further processing such that it/they are provided for processing in a membrane system at a lower pressure level than the membrane system that produced it/them (e.g., a successively lower pressure level). For example, in one embodiment, each partially purified stream produced by a membrane system associated with one pressure level is provided for processing in a membrane system associated with a lower pressure level (i.e., except for the membrane system in the lowest pressure level). In general, this includes combining permeate and/or retentate produced from one membrane system with one of the pressurized gas streams provided in the third step 43 (e.g., combining each of the one or more partially purified streams with one of the pressurized gas streams provided in the third step as illustrated in FIG. 4a). Referring to FIG. 4a, the first partially purified stream 152 is combined with the second pressurized gas stream 201 to provide a combined stream that is provided for processing in the second membrane system 200, and the second partially purified stream 252 is combined with the third pressurized gas stream 301 to provide a combined stream provided for processing in the third membrane system 300.

In a fifth step 45, a product gas obtained from one or more product streams produced from the plurality of membrane systems is provided. Referring to FIG. 4a, each membrane system may produce a product stream 150, 250, 350, etc., each of which is provided at a different pressure. Each of these product streams can be provided at its respective pressure (i.e., as individual product streams), or can be combined to provide a combined product gas. If the individual product streams are pipeline quality, it can be particularly advantageous to provide a combined product stream at a pressure suitable for injection into a natural gas grid (e.g., 800 to 1500 psig (5.5-10.3 MPa)). Depending on the pressures of the individual product streams 150, 250, 350, etc. this may be achieved simply by combining streams and/or may include adjusting the pressure of one or more of the streams (e.g., by compression, or use of an ejector). Optionally, an off-gas obtained from one or more off-gas streams is provided, which can be disposed of, used within the process (e.g., to produce heat and/or power), or provided as a value-added product (e.g., optionally after further processing).

As described above, this method and/or system provides a membrane separation over a plurality of pressure levels, wherein each pressure level is associated with a different membrane system. The pressure associated with each pressure level corresponds to the feed pressure of the membrane system at that level (i.e., the feed pressure of the first stage of the membrane system when the membrane system is a multistage membrane system) and will be understood to be the average pressure when in operation. Accordingly, a membrane system at a given pressure level will have a higher feed pressure than a membrane system at a lower pressure level.

In general, the feed pressure of each membrane system can be dependent on the pressure of the individual pressurized gas stream provided for processing in that membrane system and/or the pressure of the partially purified stream provided for processing in that membrane system. For example, in some embodiments, a partially purified stream produced at one level is combined with a pressurized gas stream provided for processing in another level. In such embodiments, it can be advantageous to configure the system such that the pressure of each partially purified stream (e.g., 152, 252) and the pressure of the individual pressurized gas stream with which it is combined (e.g., 201, 301, respectively) are at about the same pressure (e.g., identical pressures) as this simplifies the combining of the streams (e.g., via a piping tee, a vessel, or a membrane cartridge). However, in some embodiments, these pressures (i.e., the pressure of the pressurized gas stream provided for processing in a membrane system and the feed pressure of the membrane system) are different (e.g., as a result of the partially purified stream having a pressure that is higher or lower than the pressurized gas stream with which it is combined). In such cases, suitable apparatus (e.g., valve, mixer, ejector, etc.) may be required to equalize the pressures and/or combine the streams (e.g., the feed pressure of each membrane system can be between the pressure of the individual pressurized stream and the partially purified stream provided for processing therein). In some embodiments, each of one or more of the pressurized gas streams is fed to a permeate side of a membrane system such that the partially purified gas provided to the lower (e.g., subsequent) pressure level for processing includes permeate from the higher (e.g., preceding) pressure level and the corresponding pressurized gas stream. For example, in one embodiment, each pressurized gas stream is provided as a sweep gas for one membrane system prior to processing in a membrane system with a relatively low feed pressure.

Advantageously, providing a system/method wherein a membrane separation is conducted over a plurality of pressure levels (i.e., wherein the pressure is stepped down between levels), allows the relatively high pressure of the source gas to be exploited; not only to reduce feed compression costs and/or interstage compression costs, but also to reduce, minimize, and/or eliminate recycle compression costs. In particular, feeding partially purified streams produced at one pressure level for processing at a lower level reduces or eliminates recompressing the partially purified stream for recycle, while still facilitating the recovery of $CH_4$ from and/or further purification of the partially purified stream. The system(s)/method(s) disclosed herein is/are particularly advantageous for applications where the source of the pressurized gas mixture was compressed to relatively high pressures (e.g., >about 1000 psig (6.9 MPa)) for a purpose other than the membrane separation (e.g., for ease of transport). In such cases, the compression is not simply wasted after serving its purpose (e.g., after the gas mixture is transported), but can be used improve the membrane separation (e.g., by facilitating higher feed pressures without feed compression, by reducing or eliminating interstage compression, and/or by reducing or eliminating recycle compression).

Further advantageously, the system(s)/method(s) disclosed herein provide a novel approach to upgrading biogas that overcomes many of the challenges conventionally associated with upgrading biogas using membranes. For example, consider the following. Raw biogas is typically collected at pressures less than 10 psig (0.1 MPa)(e.g., 2-3 psig). Conventionally, when raw biogas is upgraded using membrane separation it may be cleaned and compressed to a pressure between about 150 psig (1.0 MPa) and 200 psig (1.4 MPa) before it is fed to a $CO_2$-selective membrane. The elevated feed pressure (e.g., at 200 psig (1.4 MPa)) is used to provide a transmembrane pressure that facilitates the membrane separation. While higher feed pressures can be advantageous for the membrane separation, such benefits typically do not outweigh the costs associated with compressing a $CO_2$ rich feed gas. Membrane separation has also been proposed to reject $N_2$ from a $CH_4$ enriched biogas (e.g., from which $H_2S$, VOCs, and $CO_2$ has been removed). However, such membrane separations may require compressing the feed gas to even higher pressures (e.g., 500 psig (3.4 MPa)). When the biogas is compressed to a relatively high pressure (e.g., >about 1000 psig (6.9 MPa)) for a purpose other than the membrane separation (e.g., for ease of transport), this compression can be exploited for the membrane separation, rather than wasted. In any case, purifying biogas using membrane separation typically involves recycle, and the recycle compression costs can be significant. For example, for a $CO_2/CH_4$ separation, a $CO_2$ rich recycle stream may need to be recycled, whereas for a $N_2/CH_4$ separation, a relatively high transmembrane pressure may require more recompression. In taking advantage of the fact that membranes used for biogas upgrading typically have much lower pressure drops (e.g., 100-200 psig (0.7-1.4 MPa)) than the pressure available from transporting biogas (e.g., 3600 psig (24.8 MPa)), the method(s)/system(s) disclosed herein can substantially eliminate the need for recompression energy and compressors. As the operational cost of a membrane system can be principally determined by the compression requirements, these savings can be substantial. Accordingly, the method(s)/system(s) disclosed herein may provide a relatively low cost approach of upgrading biogas by membrane separation. In addition, it is envisioned that in some embodiments, the required membrane area for the separation may be reduced.

In one embodiment, the system(s)/method(s) disclosed herein are part of a fuel production process that produces RNG. In one embodiment, the system(s)/method(s) include injecting the RNG into a commercial natural gas distribution system (e.g., the NG grid). In one embodiment, the system(s)/method(s) disclosed herein are part of a fuel production process that produces a transportation fuel having renewable content (e.g., RNG or a fuel other than RNG). In one embodiment, the pressurized gas mixture includes biogas, and the $CH_4$ product gas is used in a fuel production process that produces a fuel having renewable content and/or a reduced carbon intensity (CI). In one embodiment, the pressurized gas mixture includes biogas, and the $CH_4$ product gas is used in a fuel production process that subjects the $CH_4$ product gas (or its equivalent) to methane reforming to produce syngas. As will be understood by those skilled in the art, such syngas may be considered renewable and can be converted directly to a fuel having renewable content using any suitable method (e.g., to ethanol using gas fermentation, to a hydrocarbon using a Fischer-Tropsch conversion, or to hydrogen), or can be used to produce an intermediate for the renewable fuel production (e.g., to produce hydrogen for the hydrogenation of crude oil derived liquid hydrocarbon as discussed in U.S. Pat. Nos. 8,658,026, 8,753,854, 8,945,373, 9,040,271, 10,093,540, and 10,421,663). For example, when a quantity of the $CH_4$ product gas is injected into a commercial natural gas distribution system, an equal quantity of natural gas (e.g., in terms of energy) can be withdrawn elsewhere from the distribution system and is considered to be an equivalent of the injected gas when it is associated with the environmental attributes of the injected gas. In some embodiments, the $CH_4$ product gas is used in a fuel production process to produce heat and/or power for the fuel production process, thereby reducing a carbon intensity of the fuel produced.

Figure 4B:
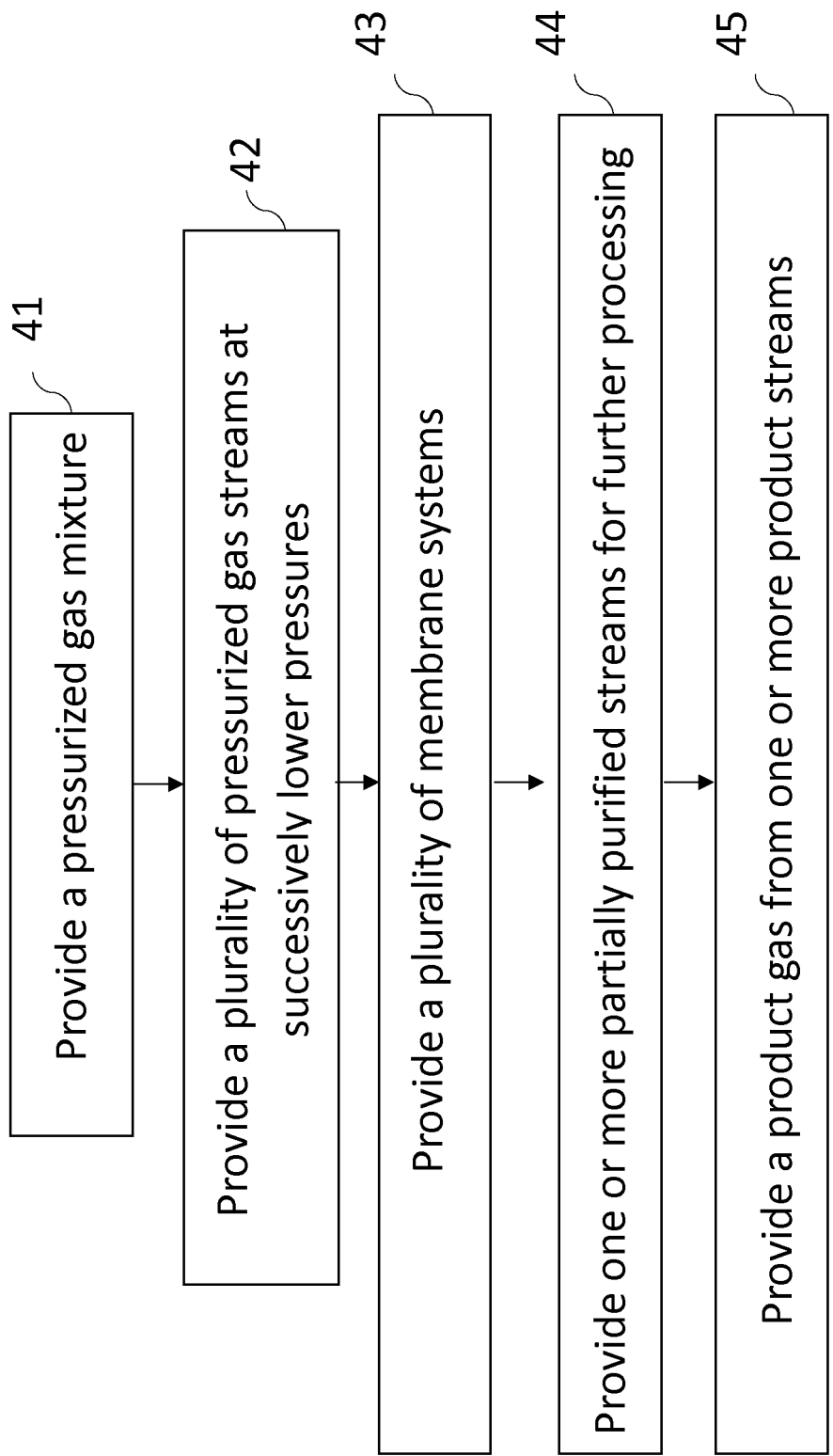
FIG. 4b is a flow diagram of a process in accordance with an embodiment of the instant invention.

Further description of the embodiment(s) described with reference to FIGS. 4a and 4b, and/or of various aspects of the invention, is provided below.

Pressurized Gas Mixture

In general, a pressurized gas mixture containing $CH_4$ and one or more non-methane components (e.g., $CO_2$, $O_2$, and/or $N_2$) is provided for the membrane separation. For example, the pressurized gas may be a raw gas (i.e., an unprocessed gas such as raw biogas or raw natural gas) or may be a processed gas (e.g., raw biogas that has been subject to a cleaning and/or partial upgrading). In embodiments where the pressurized gas mixture is a processed gas, the processing may be conducted (i) in one or more stages, (ii) using one or more technologies, (iii) at high and/or low pressure, and/or (iv) before and/or after transport.

In a preferred embodiment, the pressurized gas mixture includes raw biogas or is at least partially derived from raw biogas. The raw biogas may be obtained from any suitable source and provided using any suitable method. For example, the raw biogas may be collected from a landfill and/or from one or more anaerobic digesters (e.g., manure fed digesters or at a wastewater treatment plant (WWTP)). Raw biogas typically has a $CH_4$ content between about 35% and 75% (e.g., average of about 60%) and a $CO_2$ content between about 15% and 65% (e.g., average of about 35%), depending on the source. For example, without being limiting, raw biogas from anaerobic digesters fed agricultural waste may have a $CH_4$ content between about 50% and 75%, whereas raw biogas from a landfill site may have a $CH_4$ content between about 25% and 65%. In addition, raw biogas from a landfill site may have a $N_2$ content between 0% and 20%. In one embodiment, the pressurized gas mixture is raw biogas or is derived from raw biogas having $CH_4$ content between about 25% and 75% and a $CO_2$ content between about 15% and 65%, where the $CO_2$ and $CH_4$ make up at least 75% of the biogas by volume.

In one embodiment, the pressurized gas mixture is at least partially derived from raw biogas (e.g., is a processed gas produced by cleaning and/or upgrading raw biogas). Biogas cleaning refers to a type of biogas purification that can include removing moisture and/or other non-methane components (e.g., $H_2S$, $O_2$, $NH_3$, VOCs, siloxanes, and/or particulates), which may be present in trace amounts, but has limited $CO_2$ and/or $N_2$ removal. Biogas upgrading refers to a type of biogas purification wherein the calorific value of biogas is increased by removing $CO_2$ and/or $N_2$, and typically some other non-methane components, thereby increasing the relative amount of $CH_4$. Biogas upgrading can include biogas cleaning.

In one embodiment, the pressurized gas mixture is produced in a process that includes cleaning raw biogas (e.g., before and/or after transport). It may be advantageous to clean raw biogas prior to transport and/or the membrane separation in order to remove components such as $H_2O$, $H_2S$, $O_2$, VOCs, and/or siloxanes, which can complicate the transport and/or membrane separation and/or potentially affect the lifetime of the systems used for the same. For example, raw biogas is often fully saturated with water vapour and/or has a water content of about 7% (at 40° C.), and moisture may cause corrosion, may result in clogging upon pressure changes, and/or may cause hydrates to form, it can be advantageous to dry the biogas prior to compression and/or transport. It may be advantageous to remove $H_2S$ and/or VOCs, which are typically volatile organic compounds having a boiling point at atmospheric pressure of 50-250° C., prior to the membrane separation as these components can foul or compromise some membranes. In general, these components can be removed using any suitable technology or combination of technologies (e.g., chemical and/or physical). For example, $H_2O$ can be removed using any suitable method of drying biogas (e.g., based on refrigeration techniques and/or desiccant drying), whereas $H_2S$ may be removed using a unit based on activated carbon, molecular sieve, iron sponge, water scrubbing, NaOH washing, and/or biofilter or biotrickling filter technologies. In general, the removal of these components can be conducted in one or more individual units, where each unit primarily removes one component, or where each unit removes more than one component. For example, in addition to removing water a biogas dehumidifier may, to some degree, also remove other components such as $H_2S$, $NH_3$, and/or siloxanes. As will be understood by those skilled in the art, appropriate selection of the unit(s) for cleaning the raw biogas will be dependent upon the source of the biogas, the composition of the biogas, current technologies, and/or the design of the subsequent membrane separation. In one embodiment, the raw biogas is cleaned by removing $H_2O$ (and $NH_3$ if present) by condensation in a cool-drying step, and removing $H_2S$ (and siloxanes and/or $O_2$ if present) in a two-step adsorption process that uses an iron oxide adsorbent followed by activated carbon. In one embodiment, the raw biogas is fed to an activated carbon filter to remove $H_2S$ to under 100 ppm and some VOCs, compressed, and aggressively dried to remove $H_2O$ and more VOCs, prior compression and transport.

In one embodiment, the pressurized gas mixture is produced in a process that includes upgrading raw biogas (e.g., before and/or after transport). It may be advantageous to upgrade raw biogas prior to transport and/or the membrane separation in order to remove $CO_2$. Removing $CO_2$ prior to transport can reduce the compression and/or transportation cost per unit of energy delivered (i.e., which is related to the amount of methane in the biogas). Removing $CO_2$ prior to the membrane separation (i.e., conducted at multiple pressure levels) can be particularly advantageous when the membrane is configured to provide a $CH_4/N_2$ separation. Removing most of the $CO_2$ prior to transport (e.g., such that partially purified biogas has a $CO_2$ content less than about 8%, less than 7%, less than 6%, less than 5%, less than 4%, less than 3%, or less than 2%) can provide a feed gas that is predominately $CH_4$ and $N_2$, while minimizing the compression and/or transportation cost per unit of energy delivered, and providing a system wherein the gas decanted from the pressurize vessels can be provided directly to the membrane system at a high pressure. In general, the $CO_2$ can be removed using any suitable technology or combination of technologies including absorption (e.g., water scrubbing, organic physical scrubbing, chemical scrubbing), pressure swing adsorption (PSA), membrane, and/or cryogenic upgrading.

In one embodiment, the pressurized gas mixture is produced in a process that includes collecting raw biogas, processing the raw biogas to remove one or more components to provide a partially purified biogas, compressing the partially purified biogas and feeding the same into one or more pressurize vessels, and transporting the one or more pressurize vessels to a processing site (e.g., centralized processing site) that provides the membrane separation at various pressure levels. In this embodiment, the processing of the raw biogas can be conducted in one or more stages, using one or more technologies, at high and/or low pressures. In one embodiment, the processing removes more than 70%, 75%, 80%, 85%, 90%, 92%, 94%, 96%, or 98% of the $CO_2$ present in the raw biogas. In one embodiment, the processing removes less than 5%, 10%, 15%, 20%, 25%, or 30% of the $CO_2$ present in the raw biogas.

In one embodiment, the pressurized gas mixture is provided via a biogas delivery system, which is configured collect raw or partially purified biogas and to transport the same to a centralized processing facility (i.e., that provides the membrane separation conducted at multiple pressure levels) at relatively high pressures (e.g., at pressures of at least 1000 psig (6.9 MPa), at least 1500 psig (10.3 MPa), at least 2000 psig (13.8 MPa), at least 3000 psig (20.7 MPa), or at least 3600 psig (24.8 MPa)). In one embodiment, the biogas delivery system includes one or more vehicles (e.g., truck, ship, rail car) used to transport one or more pressure vessels containing the raw or partially purified biogas. In one embodiment, the biogas delivery system collects biogas from a plurality of biogas sources (e.g., farms, landfills, sewage treatment plants, etc.), and after an optional partial purification, the biogas from each biogas source is transported to the centralized processing facility (e.g., directly) in one or more pressure vessels in a hub-and-spoke configuration. For example, in one embodiment, the biogas is provided using the method (s)/system(s) described in U.S. Pat. No. 10,760,024.

In embodiments where the pressurized gas mixture is obtained from a pressure vessel transported to a processing facility (e.g., centralized), the gas mixture will arrive at the processing facility at a given pressure (dependent on temperature of the gas). This initial pressure of the gas mixture can determine the pressure at which the pressurized gas mixture is provided. In one embodiment, the pressurized gas mixture is provided at a pressure of at least at least 500 psig (3.4 MPa), at least 600 psig (4.1 MPa), at least 700 psig (4.8 MPa), 800 psig (5.5 MPa), at least 900 psig (6.2 MPa), at least 1000 psig (6.9 MPa), at least 1200 psig (8.3 MPa), at least 1400 psig (9.7 MPa), at least 1500 psig (10.3 MPa), at least 1600 psig (11.0 MPa), at least 1800 psig (12.4 MPa), at least 2000 psig (13.8 MPa), at least 2200 psig (15.2 MPa), at least 2400 psig (16.5 MPa), at least 2600 psig (17.9 MPa), at least 2800 psig (19.3 MPa), at least 3000 psig (20.1 MPa), at least 3200 psig (22.1 MPa), at least 3400 psig (3400 MPa), or at least 3600 psig (24.8 MPa).

Providing the pressurized gas mixture at a pressure greater than 1000 psig (6.9 MPa), preferably greater than 2000 psig (13.8 MPa), or more preferably greater than 3000 psig (20.1 MPa) is advantageous because it can increase the number of pressure levels and/or it can facilitate processing a relatively large amount (e.g., a bulk) of the pressurized gas mixture at high pressures (e.g., greater than 500 psig (3.4 MPa) or greater than 800 psig (5.5 MPa)).

In general, the number of pressure levels provided can be dependent upon the transmembrane pressure of one or more stages of the membrane system and/or the initial pressure (i.e., the pressure of the pressurized gas mixture initially provided in the pressurize vessels). For example, if the initial pressure is about 3600 psig (24.8 MPa), then the membrane separation can be conducted over more than 10 pressure levels when the transmembrane pressure is less than 360 psig (1.4 MPa). Providing more pressure levels may be advantageous as the system may more closely approximate the performance of a system with recycle when the number of pressure levels is high (e.g., at least 8, at least 10, at least 12, or at least 14 pressure levels).

In general, it may be advantageous if more than a half of the pressurized gas (by mass) from the source is processed at pressures of at least 500 psig (3.4 MPa), 800 psig (5.5 MPa), or at least 1000 psig (6.9 MPa). In particular, this may be advantageous as most of the gas in each pressurize vessel can be processed by membranes without using recycle compression and because at least half of the product streams and/or off-gas streams (by mass) may be at relatively high pressures (e.g., at least 500 psig (3.4 MPa), 800 psig (5.5 MPa), or at least 1000 psig (6.9 MPa), thereby reducing compression costs for injecting into a commercial distribution system and/or associated with providing compressed or liquid gas (e.g., CNG/LNG).

In embodiments where the pressurized gas mixture is obtained from a pressure vessel transported to a processing facility (e.g., centralized), it can be advantageous for the pressure vessel to be relatively large. In one embodiment, the pressure vessel has an internal volume of at least 5,000 L, at least 10,000 L, or at least 20,000 L (water volume). In one embodiment the pressure vessel has an internal volume between about 10,000 L and about 100,000 L, between about 20,000 L and about 60,000 L, or between about 30,000 L and about 40,000 L (water volume). In one embodiment, the pressure vessel can contain at least 100,000 SCF, at least 150,000 SCF, at least 200,000 SCF, at least 250,000 SCF, at least 300,000 SCF, or at least 400,000 SCF of compresses natural gas at 59° F. (15° C.) and 3000 psig (20.7 MPa). In one embodiment, the pressure vessel is configured to contain between 200,000 SCF and 640,000 SCF of compresses natural gas at 59° F. (15° C.) and 3000 psig (20.7 MPa). In these embodiments, the pressure vessel may be a single cylinder or multiple interconnected cylinders (e.g., and associated valves).

In some of these embodiments, providing the pressurized gas mixture includes removing raw or partially purified biogas from the pressure vessels and providing the same to a pretreatment unit that removes one or more components (e.g., $CO_2$) from the raw or partially purified biogas prior to the membrane separation. In these embodiments, the pretreatment (e.g., which can include biogas cleaning and/or upgrading) is preferably conducted at a relatively high pressure (e.g., minimal decompression of the biogas is performed for the pretreatment and/or the pretreatment is conducted at a pressure that provides the highest feed pressure for the membrane separation).

Aliquots of the Pressurized Gas Mixture

In general, a plurality of aliquots of the pressurized gas mixture is withdrawn and is provided as a plurality of pressurized gas streams at successively lower pressures (i.e., each aliquot is provided as a respective pressurized gas stream, where each pressurized gas stream is at a different pressure). In one embodiment, the number of gas streams is 2, 3, 4, 5, 6, 7, 8, 9, 10, or higher. Providing at least 5 pressurized gas streams for at least 5 pressure levels is advantageous in terms of reducing compression costs. Providing at least 10 pressurized gas streams for at least 10 pressure levels is advantageous for obtaining a high biogas purity and high biogas recovery. As will be understood by those skilled in the art, there may or may not be an interruption in gas flow between aliquots.

In general, withdrawing the plurality of aliquots of the pressurized gas mixture and providing the same as a plurality of pressurized gas streams at successively lower pressures includes depressurizing at least a portion of the pressurized gas mixture. In general, the depressurization can be achieved using any suitable apparatus. In one embodiment, the depressurization is provided by one or more pressure let down systems, each of which provides a portion of the pressurized gas mixture at a different pressure. Feeding the pressurized gas mixture to a plurality of pressure let down systems, each of which is configured to provide gas at a different pressure, is advantageous in that the pressure can be stepped down in discrete levels.

In general, while the individual pressurized gas streams (e.g., 101, 201, 301, etc.) may or may not be provided simultaneously, it can be advantageous to provide at least some of the individual pressurized gas streams simultaneously (e.g., for successive pressure levels). In one embodiment, aliquots of the pressurized gas mixture are withdrawn from a source having a relatively constant pressure (e.g., a constantly replenished source such as buffer storage or a natural gas wellhead) and all of the individual pressurized gas streams are provided simultaneously, without significant interruption. In one embodiment, aliquots of the pressurized gas mixture are withdrawn from a finite source (e.g., a pressure vessel) such that the pressure of the source continuously decreases as the aliquots are withdrawn, and such that the pressurized gas streams at pressures above the instant pressure of the source are ceased. In one embodiment, a plurality of pressurized gas streams is provided as a cascade down the plurality of pressure levels to correspond with a falling pressure resulting from the depressurization of the pressurize vessel(s).

In general, the volume of the aliquots and/or flow rate of the individual pressurized gas streams may be the same or may vary (i.e., between streams). In one embodiment, the volume of each of the aliquots is the same. In one embodiment, the volume of one or more of the aliquots is different. In one embodiment, the flow rate of the pressurized gas stream fed to the membrane system at the highest pressure level is higher than the flow rate of any of the other pressurized gas streams. In one embodiment, the flow rates of the pressurized gas streams successively decrease with decreasing pressure levels. In one embodiment, the flow rate of each of the pressurized gas streams is controlled in dependence upon the flow rate of the partially purified stream with which it is combined. For example, in one embodiment, the flow rate of each pressurized gas stream is substantially the same as the flow rate of the partially purified stream with which it is combined.

In general, withdrawing the plurality of aliquots of the pressurized gas mixture and providing the same as a plurality of pressurized gas streams can be performed using a feed system that includes one or more pressure let down systems. A pressure let down system is a system that can reduce the pressure of at least a portion of the gas mixture to a desired level. For example, a pressure let down system may include one or more mechanical regulating devices (e.g., a pressure regulator or control valve) to reduce the pressure. In one embodiment, each pressure let down system includes a pressure regulator, a temperature and/or pressure sensor, one or more valves, a metering system, a control system, and/or temperature control (e.g., a heater). With regard to the latter, the expansion or throttling of a gas provided by a pressure regulator may result in Joule-Thomson cooling of the gas. In one embodiment, each pressure let down system includes a heater upstream and/or downstream of the pressure regulator (e.g., a heat exchanger). In general, the feed system may also include any apparatus that facilitates withdraw of the aliquots and providing each pressurized gas stream at the desired pressure and/or flow rate. For example, the feed system can include high pressure piping, tubing, flexible hose, manifold(s), switching valve(s), coupling(s), compressor(s), ejector(s), mixers, pump(s), check valve(s), control valve(s), pressure regulator(s), temperature and/or pressure sensor(s), metering system(s), control system(s), temperature control(s) (e.g., a heater), etc. Various embodiments of feed systems that may be suitable for providing the plurality of pressurized gas stream are discussed below and/or are illustrated in FIGS. 10a, 10b, 10c, and 10d.

Figure 10B:
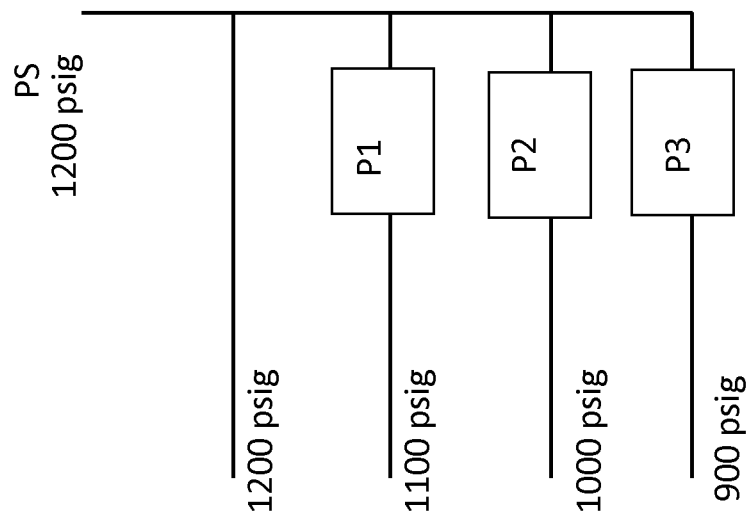
FIG. 10b is a schematic diagram of an embodiment of a system for providing a pressurized gas mixture as a plurality of pressurized gas streams at successively lower pressures from a source that does not substantially decrease in pressure as gas is removed.
Figure 10A:
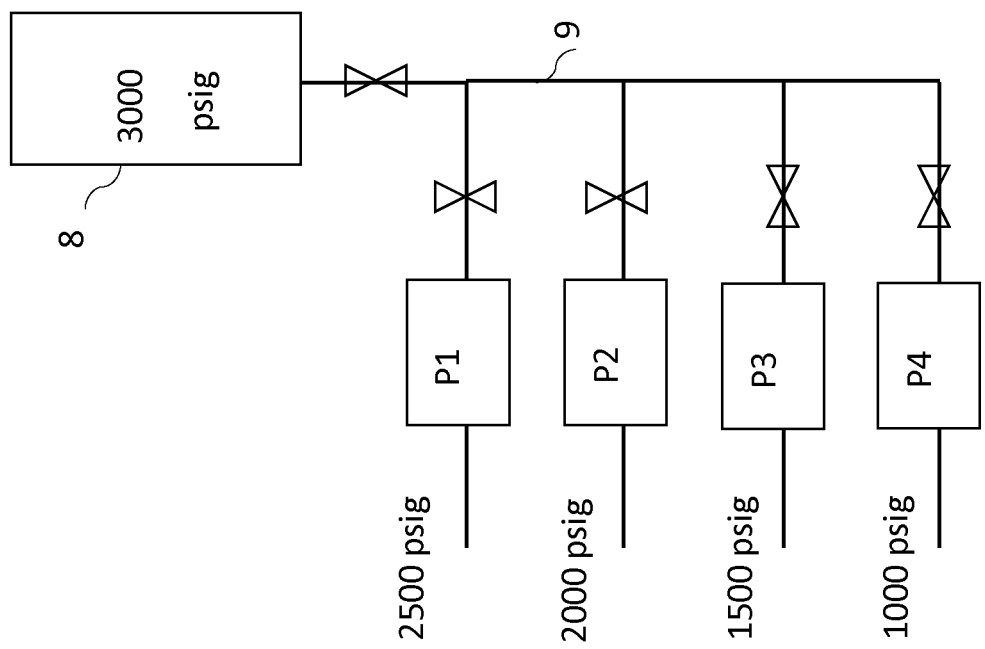
FIG. 10a is a schematic diagram of an embodiment of a system for providing a pressurized gas mixture as a plurality of pressurized gas streams at successively lower pressures from a source that decreases in pressure as gas is removed therefrom.

Referring to FIG. 10a, there is shown an embodiment of a least part of a feed system, which may be suitable when the gas mixture (e.g., raw biogas, partially purified biogas, or raw natural gas) is transported to a processing facility (e.g., centralized) in a pressure vessel 8 at some initial pressure (e.g., illustrated as 3000 psig). In this embodiment, withdrawing the aliquots from the pressure vessel results in the gas mixture in the pressure vessel being depressurized (e.g., from the initial pressure of 3000 psig down to, for example, a heel pressure of 200 psig). The feed system includes a manifold 9 that provides fluid connection between the pressure vessel 8 and a plurality of gas lines, each associated with a different pressure let down system (i.e., P1, P2, P3, P4). The pressure let down systems can be configured to provide any suitable pressures. In the illustrated example, the first pressure let down system P1 is configured to provide a gas stream at 2500 psig, the second pressure let down system P2 is configured to provide a gas stream at 2000 psig, the third pressure let down system P3 is configured to provide a gas stream at 1500 psig, and the fourth pressure let down system P4 is configured to provide a gas stream at 1000 psig. In operation, the valves to the pressure let down systems can be switched between open and closed modes in dependence upon a measured pressure in the pressure vessel or manifold. For example, in one embodiment, all of the valves are open until the pressure within the pressure vessel reaches the first pressure level (e.g., 2500 psig), at which point, the valve associated with the first pressure let down system P1 is closed. This is repeated as the pressure within the pressure vessel 8 gradually falls (e.g., the remaining valves are open until the pressure within the pressure vessel reaches the second level, third level, fourth level, etc., at which point, the valve associated with the second pressure let down system P2, third pressure let down system P3, and fourth pressure let down system P4, respectively, are closed). In one embodiment, all of the valves are close except for one, and the open valve switches to successively provide pressurized streams at sequentially lower pressure levels.

Referring to FIG. 10b, there is shown an embodiment of part of a feed system, which may be suitable when the gas mixture is provided at a substantially constant pressure (e.g., illustrated as 1200 psig) and where withdrawing the aliquots does not result in the pressure of the source falling. This may occur, for example, when the source gas is constantly replenished (e.g., when the source gas is raw natural gas from a wellhead, or is pooled gas provided in buffer storage). In this embodiment, although the highest pressure aliquot may be provided without depressurization, each of the other streams will be decompressed to some degree after being withdrawn.

Figure 10C:
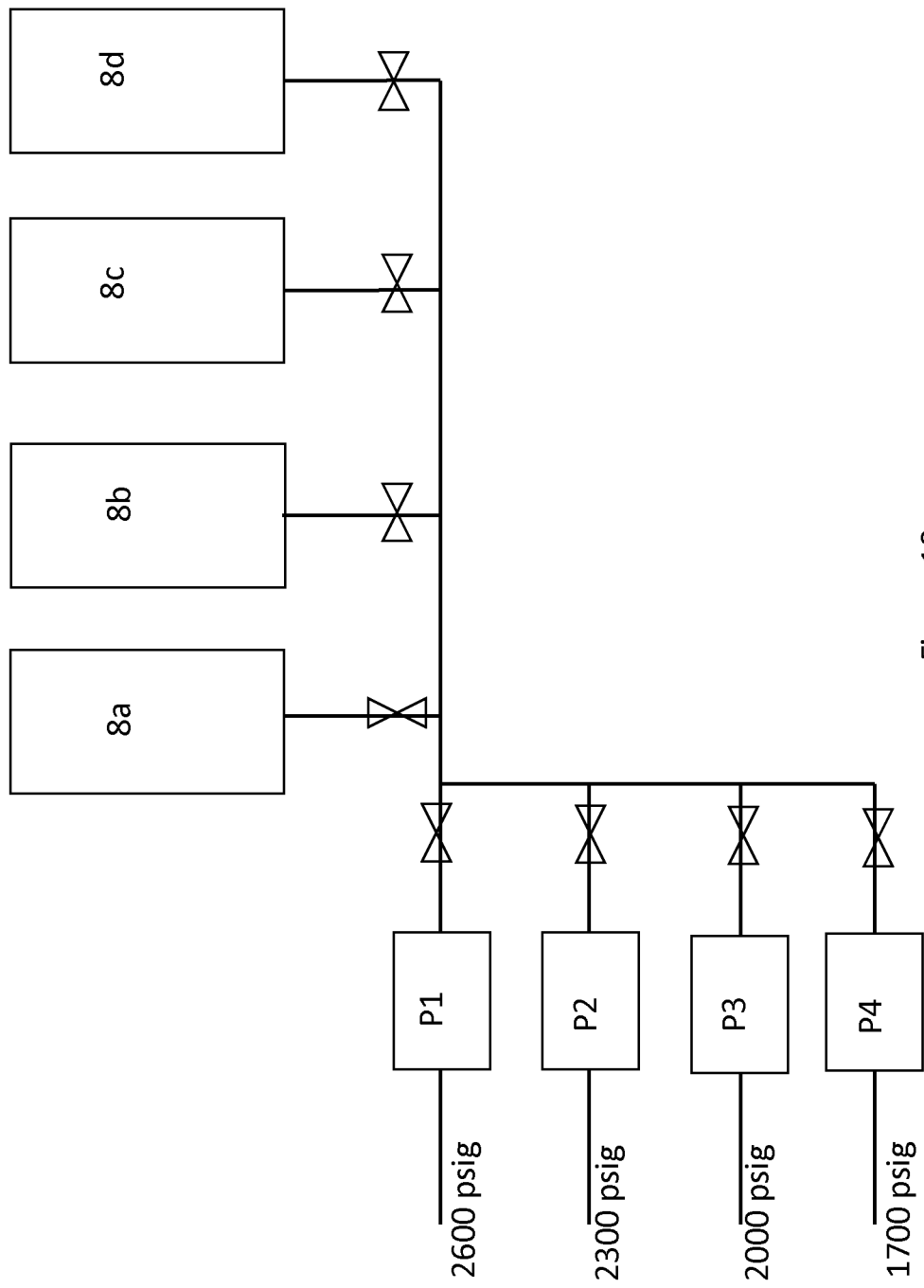
FIG. 10c is a schematic diagram of an embodiment of a system for providing a pressurized gas mixture as a plurality of pressurized gas streams at successively lower pressures from a source that comprises a plurality of pressure vessels connected to a common manifold.

In the embodiment illustrated in FIG. 10a, the gas mixture is withdrawn from a single pressure vessel. However, in practice, it may be advantageous to provide a biogas delivery system that continuously drops off filled pressure vessels and picks up empty pressure vessels for filling to/from the processing facility (e.g., in a hub and spoke configuration). In such cases, it can be advantageous for the processing facility to have a receiving station that has a plurality of docking stations, each docking station configured to accommodate one of the pressure vessels so that it can be connected to the feed system. For example, in one embodiment, the receiving station includes a plurality of docking stations, each of which can accommodate a trailer, skid, or shipping container supporting one or more pressure vessels. In FIG. 10c, four pressure vessels 8a, 8b, 8c, 8d are docked at a receiving station and are connected to a same receiving manifold. In this embodiment, the pressurized gas mixture is removed from each pressure vessel sequentially by appropriate operation of the corresponding valves. For example, as the pressure in each pressure vessel falls, the valves to the pressure let down systems P1, P2, P3, etc. are operated to reflect the falling pressure as described above. In the embodiments illustrated in FIGS. 10a and 10c, the pressurized gas streams at higher pressures are not provided continuously (e.g., the first pressurized gas stream is no longer provided once the pressure vessel is decompressed to that pressure).

Figure 10D:
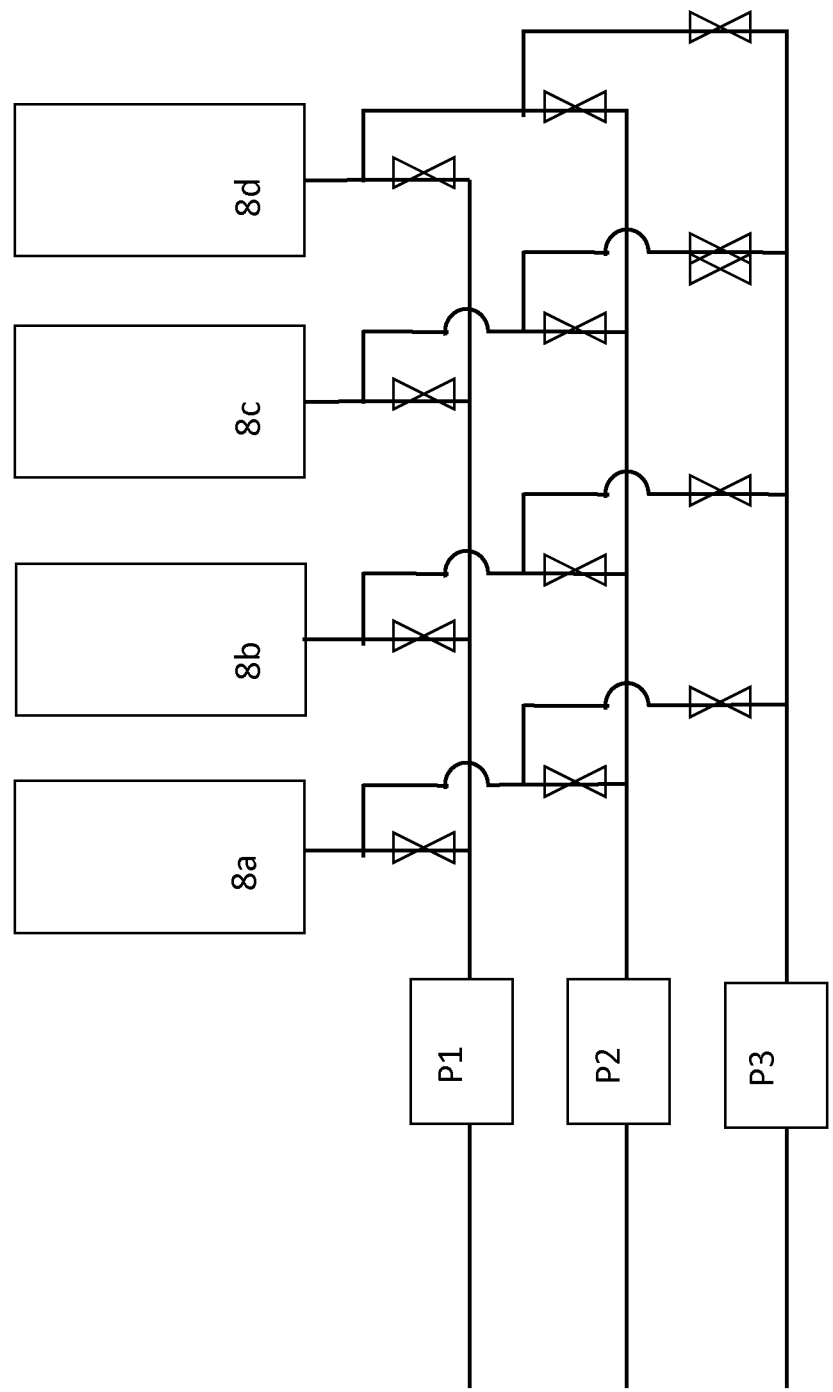
FIG. 10d is a schematic diagram of an embodiment of a system for providing a pressurized gas mixture as a plurality of pressurized gas streams at successively lower pressures from a source that comprises a plurality of pressure vessels connected to a pipe system configured to provide a substantially constant supply of gas at each pressure.

In FIG. 10d, there is shown another embodiment of part of a feed system, which may be suitable when multiple pressure vessels (e.g., 8a, 8b, 8c, 8d, etc.) can be connected to a feed system. In this embodiment, the feed system includes a configurable manifold, which can be operated to ensure that a pressurized gas stream corresponding to each of the pressure levels is continuously provided. More specifically, each pressure vessel is decanted in multiple stages as follows. In a first stage, the first pressure vessel 8a, which is full, is decanted to provide a first aliquot via the first pressure let down system P1 until the pressure in the first vessel 8a falls to a first pressure set by P1. In a second stage, the first pressure vessel 8a, which has been partially emptied and is at the first pressure, is decanted to provide a second aliquot via the second pressure let down system P2 until the pressure in the first vessel 8a falls to a second pressure set by P2. Simultaneously, the second pressure vessel 8b, which is full, is decanted to provide a third aliquot via the first pressure let down system P1 until the pressure in the second vessel 8b falls to the first pressure. In a third stage, the first pressure vessel 8a, which has been partially emptied and is at the second pressure, is decanted to provide a fourth aliquot via the third pressure let down system P3 until the pressure in the first vessel 8a falls to a third pressure set by P3. Simultaneously, the third pressure vessel 8c, which is full, is decanted to provide a fifth aliquot via the first pressure let down system P1 until the pressure in the third vessel 8c falls to the first pressure, and the second pressure vessel 8b, which has been partially emptied and is at the first pressure, is decanted to provide a sixth aliquot via the second pressure let down system P2 until the pressure in the second pressure vessel 8b falls to the second pressure. As will be understood by those skilled in the art, such steps can be repeated for each pressure level, thereby providing each of the pressurized gas streams substantially continuously (e.g., there may be no discernable interruption in flow of each of the pressurized gas streams provided for processing at each pressure level).

Of course, the pressures illustrated in FIGS. 10a-d are provided as examples only. In practice, the pressure of each pressurized gas stream, and/or of the corresponding pressure level, and/or the number of pressure levels, may be dependent on the type of membrane used (e.g., the selectivity and/or permeability for a given component), the type of separation (e.g., $CH_4/CO_2$ or $CH_4/N_2$), the required or desired transmembrane pressure, the initial starting pressure, the lowest pressure at which the membrane separation can be conducted without requiring a vacuum for the permeate side, the composition of the feed gas, and/or the desired composition of the product. Those having ordinary skill in the art will be able to select a suitable number of pressure levels and/or the pressure of each pressurized gas stream according to the specific configuration (e.g., of the system in general and/or of each membrane system). Of course, the systems illustrated in FIGS. 10a-d are also provided as examples only. Those having ordinary skill in the art will recognize that the feed system can be of any suitable configuration.

In one embodiment, the difference in pressure between successive pressure levels is constant (e.g., has the same value). In one embodiment, the difference between successive pressure levels is between about 30 psig (0.2 MPa) and about 300 psig (2.1 MPa), between about 50 psig (0.3 MPa) and about 150 psig (1.0 MPa), between about 100 psig (0.7 MPa) and about 250 psig (1.7 MPa), between about 75 psig (0.5 MPa) and about 200 psig (1.4 MPa), between about 200 psig (1.4 MPa) and about and about 500 psig (3.4 MPa), between about 300 psig (2.1 MPa) and about 500 psig (3.4 MPa), or between about 350 psig (2.4 MPa) and about 450 psig (3.1 MPa).

In one embodiment, the difference in pressure between successive pressure levels varies. For example, in one embodiment, the difference in pressure between successive pressure levels decreases with decreasing pressure levels. For example, it may be advantageous to have larger pressure increments at the higher pressure levels to improve the gas separation. In one embodiment, both the difference between successive pressure levels and the transmembrane pressure decrease with decreasing pressure levels.

In one embodiment, the difference in pressure between successive pressure levels increases with decreasing pressure levels. For example, it may be advantageous to have the pressure levels as close together as possible at the higher pressures in order to increase the number of product streams and/or off-gas streams with relatively high pressures, and thus may not require compression (e.g., prior to injection into a natural gas distribution system).

In one embodiment, the difference in pressure between successive pressure levels is substantially equivalent to the highest transmembrane pressure in each membrane system. In one embodiment, the difference in pressure between successive pressure levels is substantially equal to the cumulative transmembrane pressure of the upstream membrane system (i.e., the sum of the transmembrane pressures that contribute to the pressure drop of the partially purified stream). For example, in one embodiment, the difference in pressure between successive pressure levels is at least 30 psig (0.2 MPa), at least 50 psig (0.3 MPa), at least 75 psig (0.5 MPa), at least 100 psig (0.7 MPa), at least 150 psig (1.0 MPa), at least 200 psig (1.4 MPa), at least 250 psig (1.7 MPa), at least 300 psig (2.1 MPa), at least 350 psig (2.4 MPa), at least 400 psig (2.8 MPa), at least 450 psig (3.1 MPa), or at least 500 psig (3.4 MPa).

Membrane Systems

In general, the plurality of pressurized gas streams at successively lower pressures is provided for processing in a plurality of membrane systems having successively lower feed pressures. More specifically, each individual pressurized gas stream is provided for processing in a respective membrane system.

In general, each membrane system can use any suitable membrane(s), including those that are commercially available (e.g., carbon, polymeric, rubbery, etc.). For example, each membrane may be formed using any suitable membrane material or combination of materials, have any suitable membrane area, and/or have any suitable permeability/permeance and/or selectivity. The permeability/permeance of a membrane relates to the productivity of the membrane (e.g., how much of a component permeates through the membrane of given area at a given pressure drop over a given time interval). While the permeance takes the membrane thickness into account, the permeability does not (e.g., reflects material properties). Permeance can be expressed in gas permeance units (GPU). One $GPU=3.35\times10^{-10}$ mol/$m^2sPa$. The selectivity of a membrane relates to the separation performance of the membrane, and more specifically, is a measure of the ability of one gas component to flow through the membrane over that of another gas component (e.g., calculated as a ratio of the permeabilities of two components). For example, in one embodiment, the selectivity of the membrane(s) used in the membrane system is between about 1 and 100, or higher, whereas the permeance is between about 100 GPU and 800 GPU, or higher.

In general, the membrane(s) can be configured to provide a $CO_2/CH_4$ separation, a $CH_4/N_2$ separation, and/or another separation. While membrane(s) are often described herein as providing a $CO_2/CH_4$ separation or a $CH_4/N_2$ separation, one skilled in the art will understand that this is to reflect the primary separation, and that such membranes may also be selective to one or more other components. For example, some commercially available $CO_2$-selective membranes may also be selective for $H_2S$ and/or $H_2O$ over $CH_4$.

In one embodiment, each membrane system includes a membrane configured to provide a $CO_2/CH_4$ separation. This is particularly advantageous when the gas mixture is predominately $CO_2$ and $CH_4$ (e.g., some raw or partially purified biogases). Commercially available membranes for $CO_2/CH_4$ separations are often $CO_2$-selective polymeric membranes. For example, such membranes may be glassy polymer membranes fabricated from cellulose acetate, polyimide, polycarbonate, polysulfone, perfluoropolymer, etc. The $CO_2/CH_4$ selectivity of such membranes can vary, but may be between about 1.5 and 50, or higher.

In one embodiment, each membrane system includes a membrane configured to provide a $CH_4/N_2$ separation. This is particularly advantageous when the gas mixture is predominately $N_2$ and $CH_4$. Membranes for $N_2/CH_4$ separations may be $N_2$-selective (e.g., glassy membranes formed from perfluororopolymer) or $CH_4$-selective (e.g., rubbery membranes formed from silicone). The $N_2/CH_4$ or $CH_4/N_2$ selectivity of such membranes can vary, but may be between about 1.5 and 5.5.

In general, each membrane system may be configured to provide any suitable flow pattern (e.g., concurrent, countercurrent, dead-end, mixed, or cross-flow). In many embodiments, it can be advantageous for each membrane system to operate in a countercurrent mode (e.g., countercurrent parallel mode or a pure countercurrent mode). In each of these countercurrent modes, the feed gas flows in one direction and permeate is withdrawn in the opposite direction, to optimize the efficiency of the separation. In countercurrent parallel operation, the permeate gas throughout the canister mixes. Pure countercurrent operation maintains the permeate gases largely in plug flow and is characteristic of spiral wound membranes.

In general, each membrane system can be a single stage membrane system or a multistage membrane system. In embodiments, where each membrane system is a multistage membrane system, the membrane system can be provided in any suitable configuration (e.g., including configurations that use a sweep gas). The number of stages can be dependent on the membrane selectivity (e.g., for $CO_2/CH_4$ or $N_2/CH_4$ or $CH_4/N_2$)) and the desired level of purification provided at each stage. Poor selectivity may dictate multiple stages and/or the need for $CH_4$ recovery (e.g., recycling or using the varying pressure levels, as disclosed herein). For example, as a result of the tradeoff between selectivity and permeability of $CO_2$-selective membranes, $CO_2$ removal from biogas is often achieved using two or three stages of membrane separation. In one embodiment, each membrane system in the plurality has a configuration based on one of the configurations illustrated in FIG. 1a, 1b, 2a, 2b, 2c, 2d, or 2e (e.g., adapted to obviate the recycle and/or using any suitable flow pattern).

In general, the membranes in different stages of each membrane system and/or the membrane systems in different pressure levels may be of the same type (e.g., same membrane material/thickness/support/geometry) or different types (e.g., different membrane materials/thicknesses/support/geometry) and/or may have the same selectivity and permeance or a different selectivity and permeance. For example, in one embodiment, upstream stages (e.g., the first stage) have a higher $CO_2/CH_4$ selectivity than downstream stages (e.g., the second stage). In one embodiment, upstream stages (e.g., the first stage) have a lower $CO_2/CH_4$ selectivity than downstream stages (e.g., the second stage). In embodiments, where the membranes are of the same type, the selectivities may differ as a result of different operating temperatures (e.g., increasing the operating temperature of the membrane may increase the permeability and thus productivity, but decrease its selectivity, and thus efficiency). In addition, the membranes in different stages of each membrane system and/or the membrane systems in different pressure levels may have the same area or different areas (e.g., the number of canisters may or may not vary). The required membrane area is readily determined by those skilled in the art and may be calculated on the basis of the particular membrane separation.

In general, each membrane system can be operated using any appropriate feed pressure, flow rate, temperature, and/or transmembrane pressure. As will be understood by those skilled in the art, the separation capability of a membrane is a function not only of the membrane selectivity, but also of the pressure ratio (total feed pressure:total permeate pressure) across the membrane. The feed pressures, transmembrane pressure, and/or flow rates may be controlled with upstream valves and/or downstream valves (not shown). As will be understood by those having ordinary skill in the art, these and other parameters may be selected in dependence upon the compression available from transport, the membrane material, the membrane area, membrane configurations, and the composition of the gas mixture. For example, the transmembrane pressure may be selected in dependence upon the capability of the membrane to withstand the conditions to which it may be subjected during the separation.

In general, the membranes in different stages of a membrane system and/or the membrane systems in different pressure levels may be operated similarly (e.g., same temperature) or differently (e.g., different temperature). In one embodiment, the operating temperature of the membrane system corresponding to each pressure level (i.e., the temperature of the feed gas for the first stage) decreases with decreasing pressure levels. For example, this may reflect the falling temperature of biogas decanted from a pressure vessel at pressures above 2400 psig, or in particular, above 3000 psig.

In general, each membrane system is configured to produce a partially purified stream, a product stream, and/or an off-gas stream. In one embodiment, each of the membrane systems produces a partially purified stream. In one embodiment, each of the membrane systems produces a product stream. In one embodiment, each of the membrane systems produces an off-gas stream. In one embodiment, each of the membrane systems produces a product stream and a partially purified stream. In one embodiment, each of the membrane systems produces an off-gas stream and a partially purified stream. In one embodiment, each membrane system produces one of each of the three streams (e.g., a product stream, and off-gas stream, and a partially purified stream). In one embodiment, each membrane system produces multiples of these streams (e.g., a product stream, a partially purified stream, and two off-gas streams).

In many embodiments, each membrane system will produce a partially purified stream that can be provided for processing at a lower pressure level, with the exception of the last membrane system (i.e., the membrane system at the lowest pressure level). In one embodiment, the last membrane system produces a partially purified stream that is disposed of (e.g., flared) or is combusted for process heat and/or electricity. In one embodiment, the last membrane system does not produce a partially purified stream, but instead employs recycle. In one embodiment, each of the membrane systems produces 1) a product stream and/or an off-gas stream, and 2) a partially purified stream, except for the last membrane system (i.e., at the lowest pressure level), which does not produce a partially purified stream as it employs recycle.

FIGS. 5a, 5b, 6a, 6b, 7, 8a, 8b, and 9 illustrate some embodiments of membrane separations wherein partially purified streams produced at one pressure level are provided for processing at a lower pressure level. In each case, a first portion of the pressurized gas mixture passes through a first pressure let down system to provide a first pressurized gas stream 101 at a first pressure, a second portion of the pressurized gas mixture passes through a second pressure let down system to provide a second pressurized gas stream 201 at a second pressure (lower than the first pressure), and a third portion of the pressurized gas mixture passes through a third pressure let down system to provide a third pressurized gas stream 301 at a third pressure (lower than the second pressure).

Figure 5B:
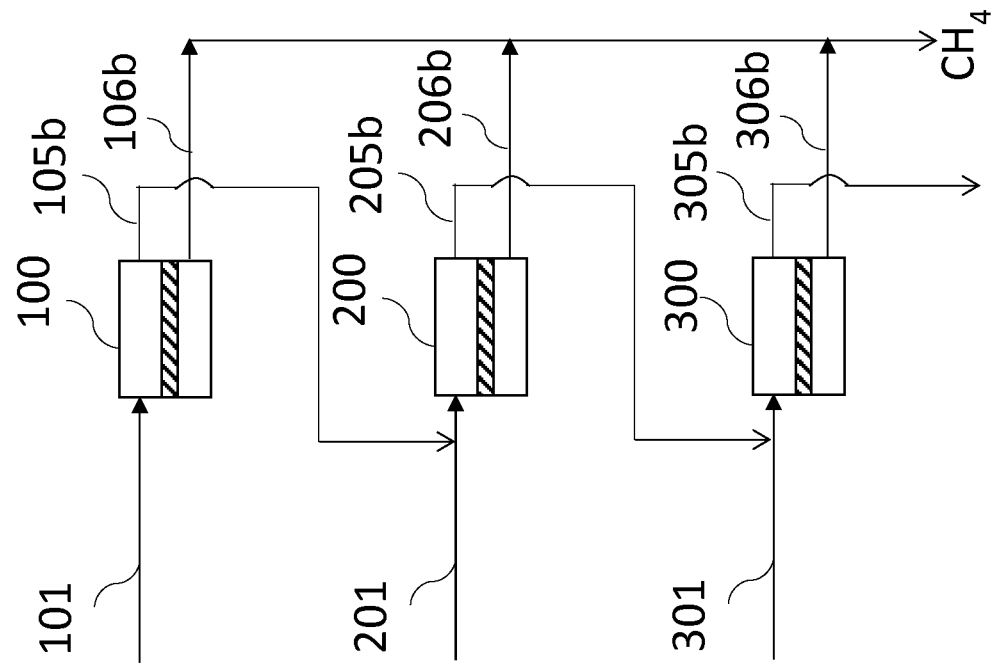
FIG. 5b is a schematic diagram of membrane separation in accordance with an embodiment that uses a plurality of membrane systems, wherein each membrane system is a single stage $CH_4$-selective membrane.
Figure 5A:
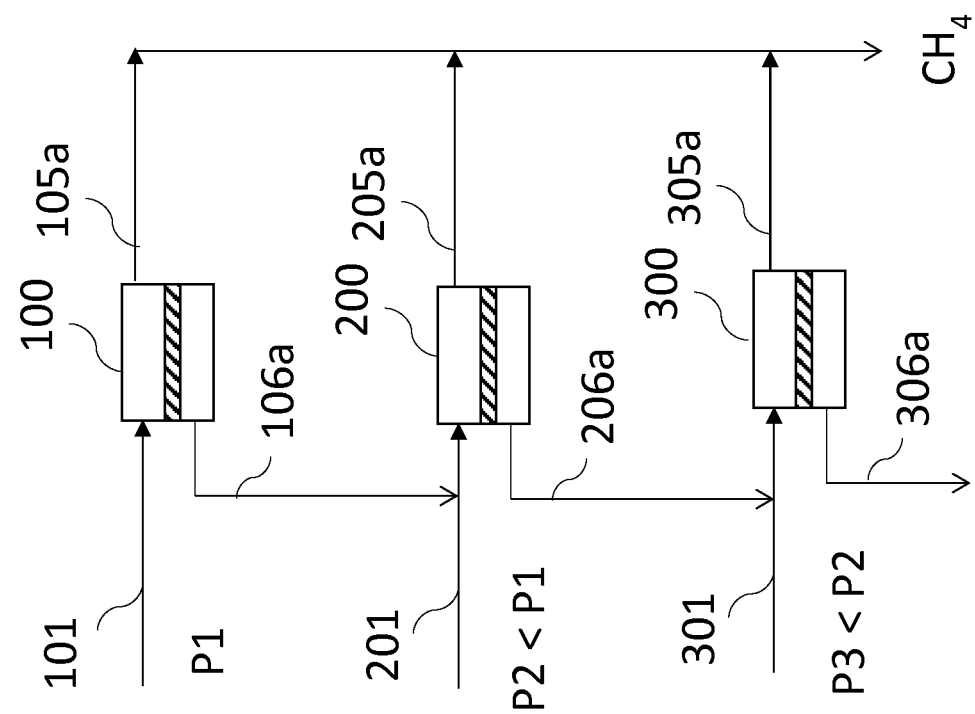
FIG. 5a is a schematic diagram of membrane separation in accordance with an embodiment that uses a plurality of membrane systems, wherein each membrane system is a single stage $CO_2$-selective membrane.

Referring to the embodiment illustrated in FIG. 5a, the pressurized gas mixture is primarily $CO_2$ and $CH_4$ and each membrane system 100, 200, 300 is a single stage membrane system having a $CO_2$-selective membrane, which provides a retentate stream 105a, 205a, 305a and a permeate stream 106a, 206a, 306a, respectively. In this embodiment, the retentate stream 105a, 205a, 305a from each membrane system is a $CH_4$ enriched stream (e.g., having a $CH_4$ content greater than 92%) and each permeate stream 106a, 206a, 306a is a $CH_4$ depleted stream, which is provided as a partially purified stream to the next successively lower pressure level (i.e., except for 306a). As illustrated, the retentate streams 105a, 205a, 305a are combined to provide the product gas.

Referring to the embodiment illustrated in FIG. 5b, the pressurized gas mixture is primarily $N_2$ and $CH_4$ and each membrane system 100, 200, 300 is a single stage membrane system having a $CH_4$-selective membrane, which provides a retentate stream 105b, 205b, 305b and a permeate stream 106b, 206b, 306b, respectively. In this embodiment, the permeate stream 106b, 206b, 306b from each membrane system is a $CH_4$ enriched stream (e.g., having a $CH_4$ content greater than 92%) and each retentate stream 105b, 205b, 305b is a $CH_4$ depleted stream each, which is passed to the next successively lower pressure level (i.e., except for 305b). As illustrated, the permeate streams 106b, 206b, 306b are combined to provide the product gas.

Figure 6A:
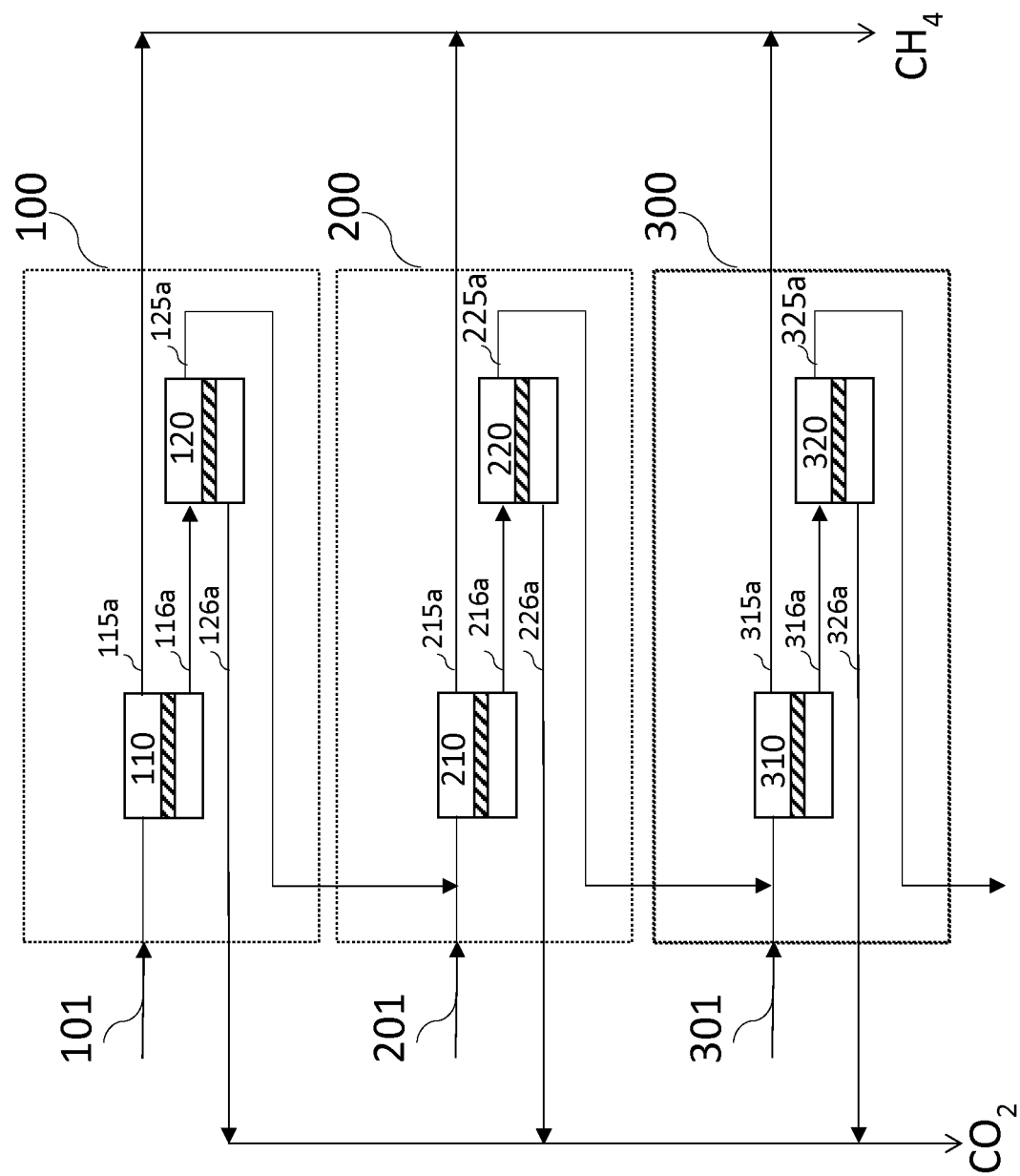
FIG. 6a is a schematic diagram of a membrane separation in accordance with an embodiment that uses a plurality of membrane systems, wherein each membrane system is a two stage $CO_2$-selective membrane.

Referring to the embodiment illustrated in FIG. 6a, the pressurized gas mixture is primarily $CO_2$ and $CH_4$ and each membrane system 100, 200, 300 is a two stage membrane system having a $CO_2$-selective membrane. The first stage 110, 210, 310 of each membrane system produces a retentate stream 115a, 215a, 315a enriched in $CH_4$, which is provided as a product stream, and a permeate stream 116a, 216a, 316a, which is depleted in $CH_4$ and is passed to the second stage 120, 220, 320, respectively. The second stage 120, 220, 320 of each membrane system produces a retentate stream 125a, 225a, 325a enriched in $CH_4$, which is passed to the next successively lower pressure level (i.e., except for 325a), and a permeate stream 126a, 226a, 326a, which is depleted in $CH_4$ and provided as an off-gas stream (e.g., $CO_2$ rich). As illustrated, the retentate streams 115, 215, 315 from the first stage are combined to provide the product gas, whereas the permeate streams 126, 226, 326 from the second stage are combined to provide a $CO_2$-rich off-gas.

Figure 6B:
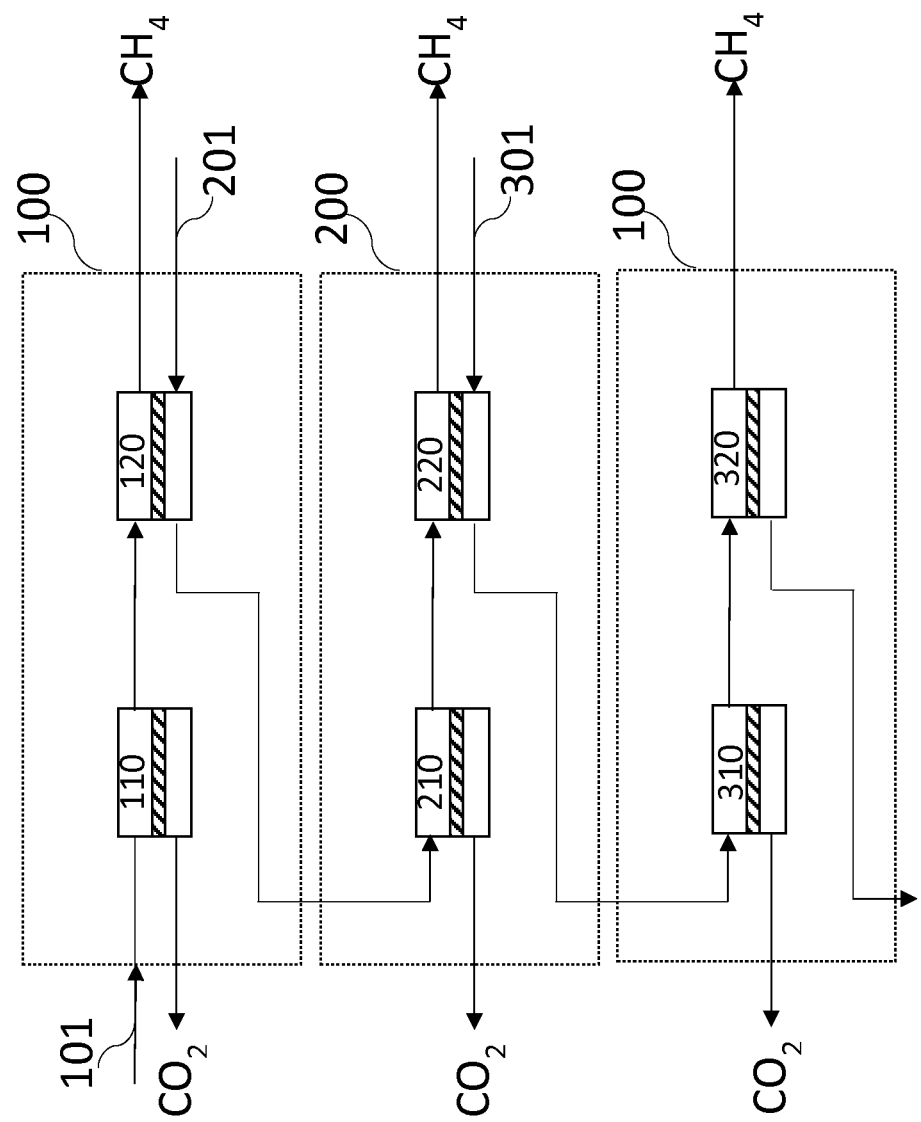
FIG. 6b is a schematic diagram of a membrane separation in accordance with another embodiment that uses a plurality of membrane systems, wherein each membrane system is a two stage $CO_2$-selective membrane.

Referring to the embodiment illustrated in FIG. 6b, the pressurized gas mixture is primarily $CO_2$ and $CH_4$ and each membrane system 100, 200, 300 is a two stage membrane system having a $CO_2$-selective membrane. The first stage 110, 210, 310 of each membrane system produces a retentate stream enriched in $CH_4$, which is passed to the second stage 120, 220, 320, respectively, and a permeate stream, which is depleted in $CH_4$ and provided as a $CO_2$ rich off gas (e.g., greater than 90% $CO_2$). The second stage 120, 220, 320 of each membrane system produces a retentate stream, which is provided as a product stream (e.g., greater than 94% $CH_4$), and a partially purified stream, which is passed to the next successively lower pressure level (i.e., except for the last pressure level). In this embodiment, the second pressurized gas stream 201 is provided as a sweep gas for the second stage of the first membrane system 110. Accordingly, the partially purified stream provided to the second membrane system 200 is a combined stream, which contains permeate from the second stage 120 and gas from the sweep gas 201.

Figure 7:
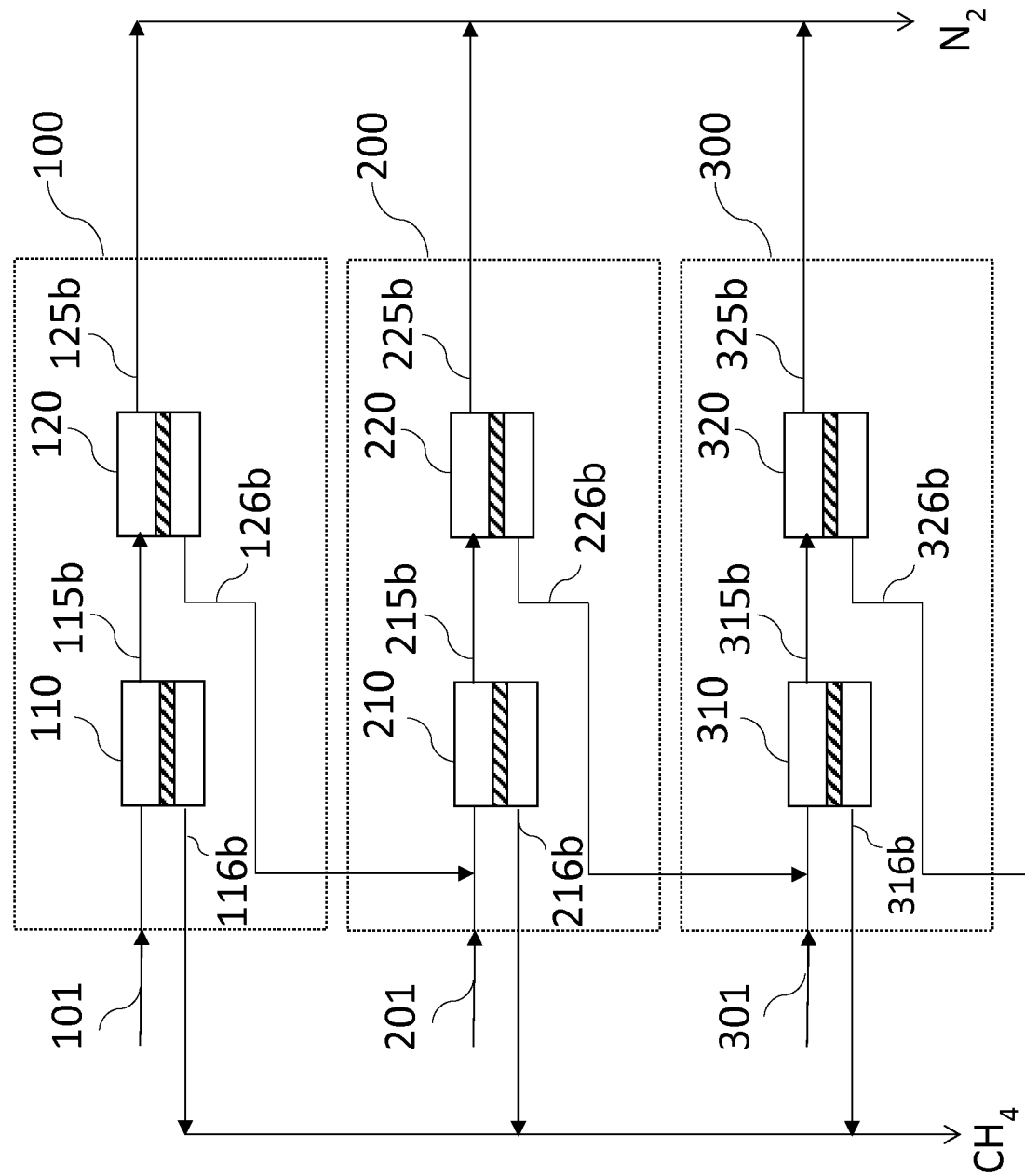
FIG. 7 is a schematic diagram of a membrane separation in accordance with an embodiment that uses a plurality of membrane systems, wherein each membrane system is a two stage $CH_4$-selective membrane.

Referring to the embodiment illustrated in FIG. 7, the pressurized gas mixture is primarily $N_2$ and $CH_4$ and each membrane system 100, 200, 300 is a two stage membrane system having a $CH_4$-selective membrane. The first stage 110, 210, 310 of each membrane system produces a retentate stream 115b, 215b, 315b depleted in $CH_4$, which is passed to the second stage 120, 220, 320, respectively, and a permeate stream 116b, 216b, 316b, which is enriched in $CH_4$ and is provided as a product stream. The second stage 120, 220, 320 of each membrane system produces a retentate stream 125b, 225b, 325b that is depleted in $CH_4$ and provided as an off-gas stream (e.g., $N_2$ rich), and a permeate stream 126b, 226b, 326b, enriched in $CH_4$, which is passed to the next successively lower pressure level (i.e., except for 326b). As illustrated, the permeate streams 116b, 216b, 316b from the first stage are combined to provide the product gas, whereas the retentate streams 125b, 225b, 325b from the second stage are combined to provide a $N_2$-rich off-gas.

Figure 8A:
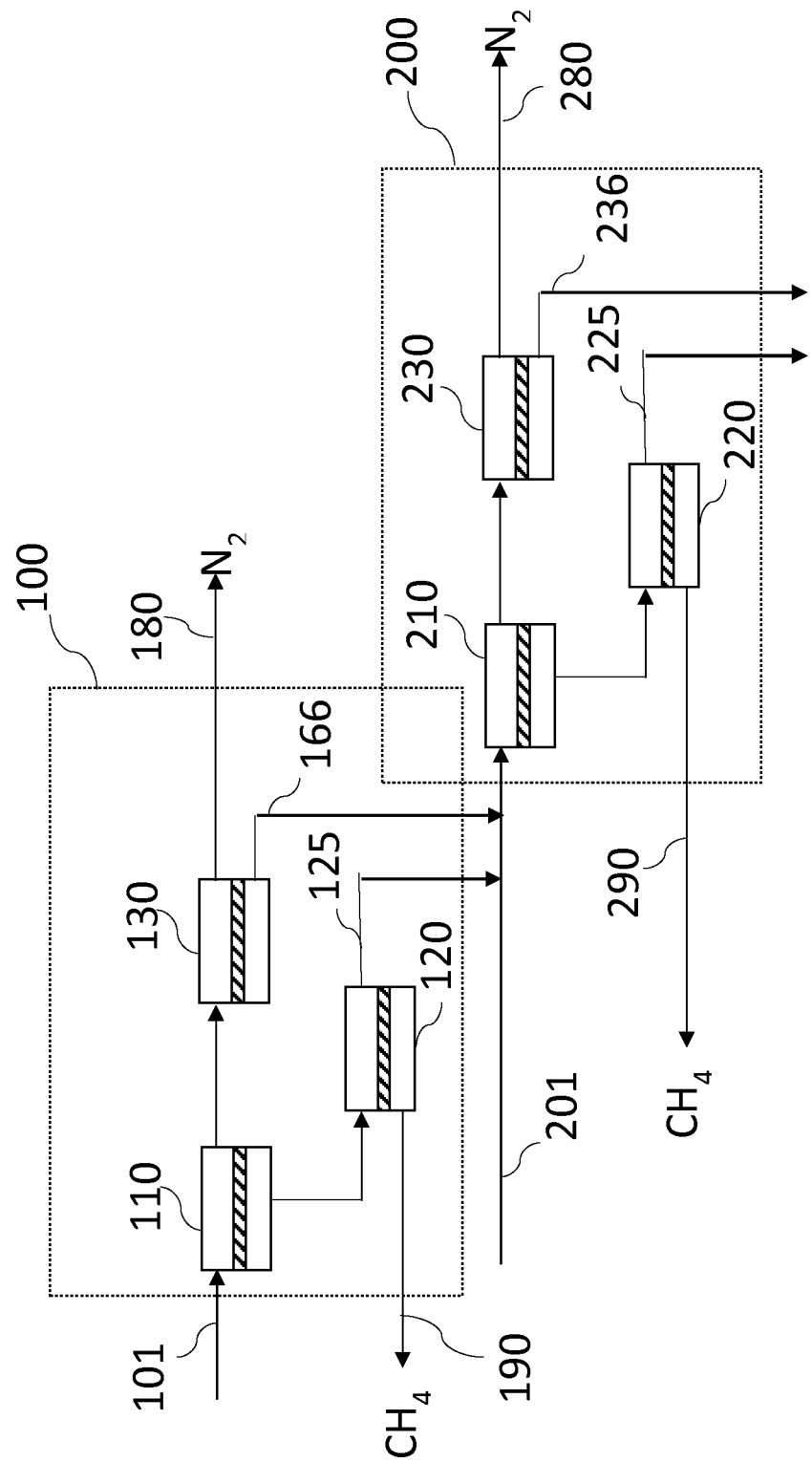
FIG. 8a is a schematic diagram of a membrane separation in accordance with an embodiment that uses a plurality of membrane systems, wherein each membrane system is a three stage $CH_4$-selective membrane.
Figure 8B:
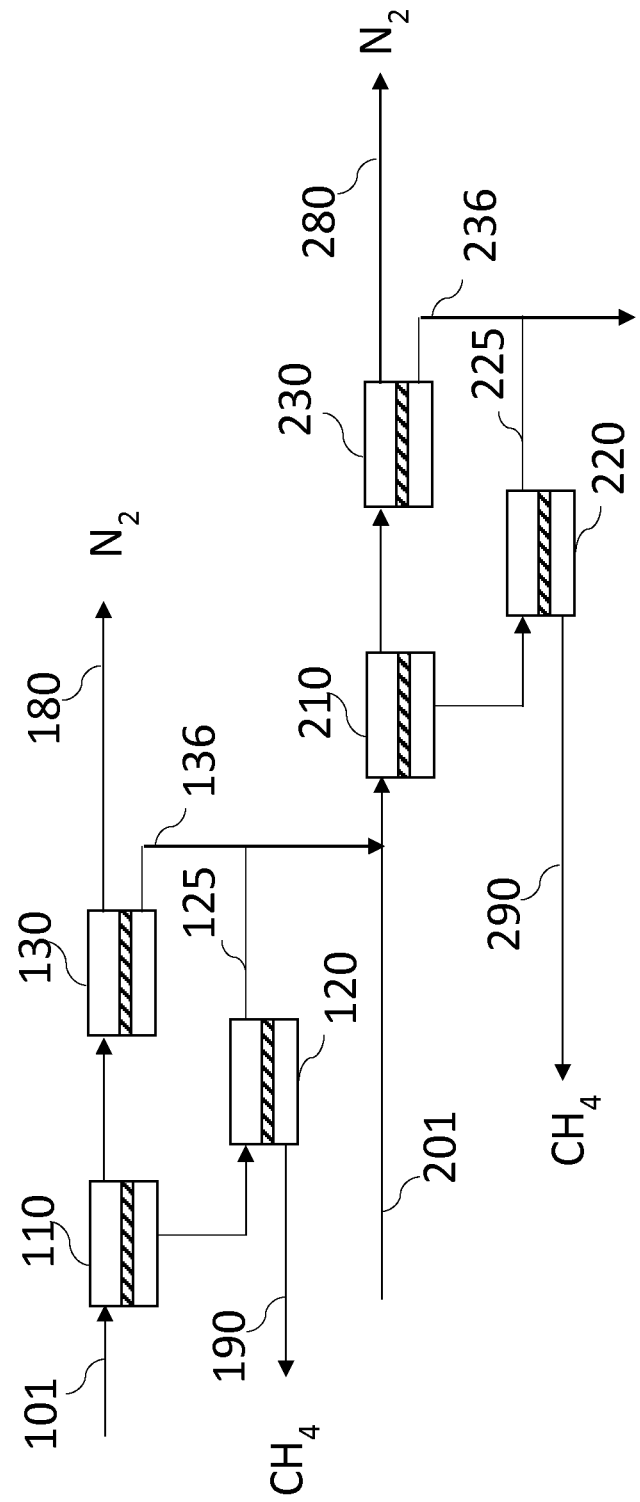
FIG. 8b is a schematic diagram of a membrane separation in accordance with another embodiment that uses a plurality of membrane systems, wherein each membrane system is a three stage $CH_4$-selective membrane.

Referring to the embodiments illustrated in FIGS. 8a and 8b, the pressurized gas mixture is primarily $N_2$ and $CH_4$ and each membrane system is three stage membrane system including a $CH_4$-selective membrane. The first stage 110, 210 of each membrane system 100, 200 produces a permeate stream, which is enriched in $CH_4$ and is passed to a second stage 120, 220 (e.g., for further purification), and a retentate stream, which is depleted in $CH_4$, and is passed to the third stage 130, 230 (e.g., for further $CH_4$ recovery), respectively. The retentate stream 180, 280 from the third stage 130, 230 of each membrane system is depleted in $CH_4$ and is provided as an off-gas stream (e.g., $N_2$-rich). The permeate stream 190, 290 from the second stage 120, 220 of each membrane system is enriched in $CH_4$ and is provided as a product stream. In FIG. 8a, the retentate streams 125, 225 from the second stage 120, 220 of each membrane system and the permeate streams from the third stage 130, 230 of each membrane system, each of which is a partially purified stream, is provided to the next highest pressure level for further processing. In FIG. 8b, the retentate streams 125, 225 from the second stage 120, 220 of each membrane system and the permeate streams from the third stage 130, 230 of each membrane system, are combined to provide a partially purified stream that is fed to the next highest pressure level for further processing.

Figure 9:
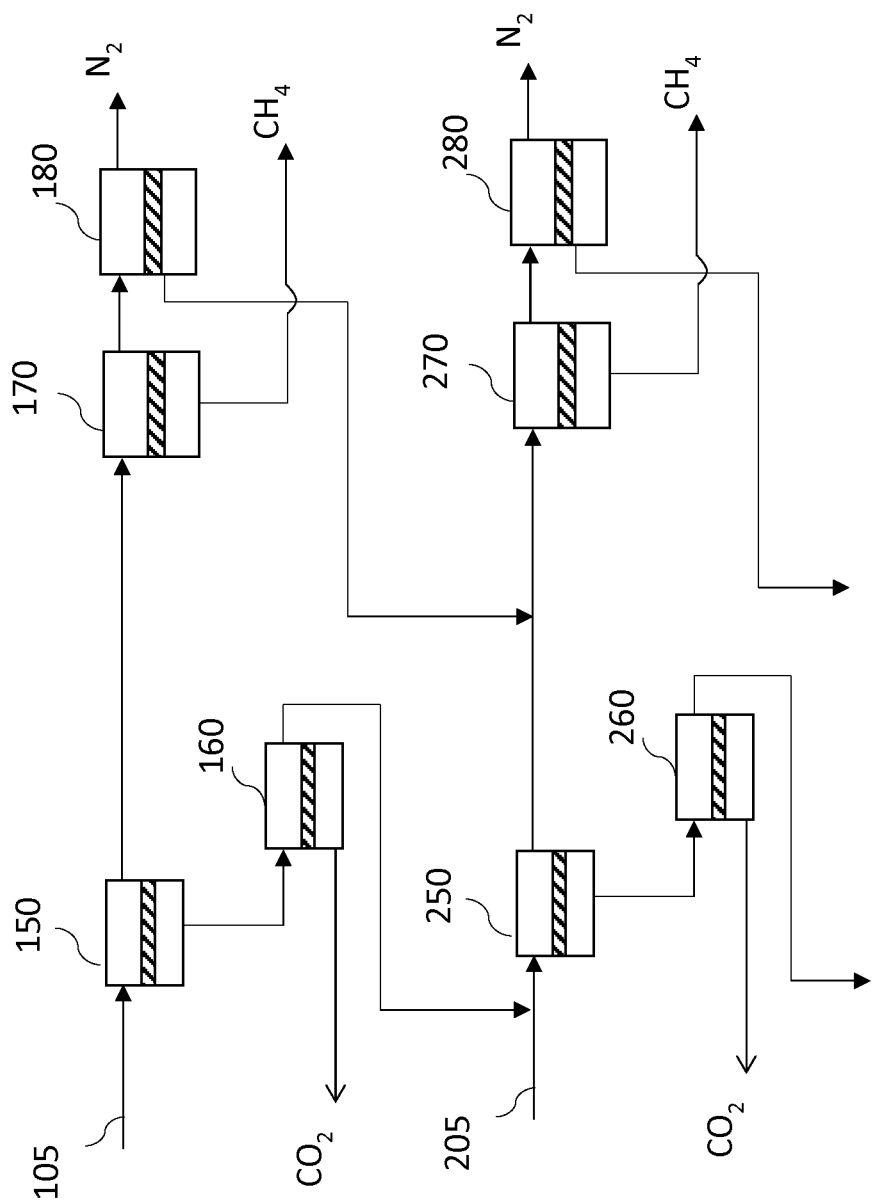
FIG. 9 is a schematic diagram of a membrane separation in accordance with an embodiment that uses a plurality of membrane systems, wherein the membrane separation includes a two stage $CO_2$-selective membrane separation followed by a two stage $CH_4$-selective membrane separation.

Referring to FIG. 9, the pressurized gas mixture is primarily $CO_2$, $CH_4$, and $N_2$, and each membrane system includes a two stage $CO_2/CH_4$ membrane separation and a two stage $N_2/CH_4$ membrane separation. More specifically, each pressurized gas stream 105, 205 is fed to a first stage 150, 250 of the $CO_2/CH_4$ membrane separation, which produces a retentate stream enriched in $CH_4$, which is passed to a first stage 170, 270 of the $N_2/CH_4$ membrane separation. The permeate of the first stage 170, 270 of each $N_2/CH_4$ membrane separation is provided as a product stream, whereas the retentate of the second stage 180, 280 of the $N_2/CH_4$ membrane separation is provided as an $N_2$ rich off-gas. The permeate of the second stage 160, 260 of each $CO_2/CH_4$ membrane separation is provided as an $CO_2$ rich off-gas. The retentate of the second stage 160, 260 of each $CO_2/CH_4$ membrane separation and the permeate of the second stage 180, 280 of each $N_2/CH_4$ membrane separation are provided as partially purified streams for processing in a subsequent pressure level (e.g., except for the corresponding streams produced at the lowest pressure level).

Notably, while each membrane stage illustrated in FIGS. 5a, 5b, 6a, 6b, 7, 8a, 8b, and 9 (and/or FIG. 1a-c or 2a-e) shows permeate being withdrawn from at least one membrane stage, the placement of the output stream was selected for ease of illustration; the embodiments in and/or described with reference to these figures are not limited to a specific flow pattern.

Advantageously, various embodiments described herein provide a novel configuration wherein the plurality of membrane systems are arranged in parallel such that each membrane system receives one of the aliquots and are arranged in series such that the partially purified gas produced by each of one or more of the membrane systems is carried forward to feed another membrane system.

Advantageously, various embodiments described herein can eliminate the need for compressors for the membrane separation particularly when the initial pressure of the pressurized gas is sufficiently high (e.g., greater than 1000 psig, preferably greater than 2000 psig, or more preferably greater than 3000 psig). In one embodiment, the system does not include any interstage or recycle compressors (except for the last pressure level, which may employ recycle). In addition to reducing or eliminating the need for feed compressors, interstage compressors, and/or recycle compressors, the method(s)/system(s) disclosed herein can also reduce or eliminate compression costs associated with the product and/or off-gas streams. For example, in the embodiments illustrated in FIGS. 5a and 6, since the individual product streams 105a, 115a correspond to retentate, which typically experiences minimal pressure drop, the pressure of these product streams can be close to the pressure of the fresh feed stream 101. In the embodiments illustrated in FIGS. 5b and 7, since the individual product streams 106b, 116b correspond to permeate, the pressure of these streams will be lower than the pressure of the fresh feed stream 101 (e.g., by about 30-500 psig depending on the transmembrane pressure of the first stage). As $CH_4$ product gas may need to be compressed for injection into a natural gas distribution system (e.g., 800 psig (5.5 MPa) or higher), whereas $CO_2$ off gas may need to be compressed for injection into a $CO_2$ pipeline (e.g., between about 1250 psig (8.6 MPa) and about 2200 psig (15.2 MPa), or higher), providing at least some of these streams at pressures above the typical injection pressures can significantly save compression costs. In one embodiment, more than half of the membrane systems in the plurality have a feed pressure greater than 800 psig, greater than 900 psig, or greater than 1000 psig. Providing as many pressure levels as possible close to the initial pressure value can significantly reduce compression costs associated with compression of the product gas and/or compression of the off-gas.

In one embodiment, the feed pressure of at least one membrane system is at least 500 psig (3.4 MPa), at least 600 psig (4.1 MPa), at least 700 psig (4.8 MPa), 800 psig (5.5 MPa), at least 900 psig (6.2 MPa), at least 1000 psig (6.9 MPa), at least 1200 psig (8.3 MPa), at least 1400 psig (9.7 MPa), at least 1500 psig (10.3 MPa), at least 1600 psig (11.0 MPa), at least 1800 psig (12.4 MPa), at least 2000 psig (13.8 MPa), at least 2200 psig (15.2 MPa), at least 2400 psig (16.5 MPa), at least 2600 psig (17.9 MPa), at least 2800 psig (19.3 MPa), at least 3000 psig (20.1 MPa), at least 3200 psig (22.1 MPa), at least 3400 psig (3400 MPa), or at least 3600 psig (24.8 MPa).

In each embodiment, the membrane system at the lowest pressure level may be configured to provide recycle (in which case the compression costs are reduced) or may be configured to produce a partially purified stream that can be disposed of (e.g., treated and/or flared) or used to produce heat and/or power for the process (e.g., to produce a warming gas as discussed in PCT Application No. PCT/CA2019/000122).

Partially Purified Streams

In general, each membrane system may provide a partially purified stream, which contains a sufficient amount of $CH_4$ to warrant further purification by membrane separation (e.g., in order to recover more $CH_4$ and/or further purify an off-gas). Each partially purified stream may contain permeate from one or more of the stages, retentate from one or more of the stages, and/or a combined stream containing retentate from one stage and permeate from another stage. In some embodiments, each of the one or more partially purified stream also includes gas from one of the pressurized gas streams.

In one embodiment, each of the partially purified streams has a $CH_4$ content of at least 5%, at least 10%, at least 20%, at least 30%, at least 40%, at least 50%, at least 60%, at least 70%, at least 75%, at least 80%, at least 85%, or at least 90%. In one embodiment, each partially purified stream has a $CH_4$ content that is not more than 97%, not more than 96%, not more than 95%, not more than 94%, not more than 93%, not more than 92%, not more than 91%, not more than 90%, not more than 89%, not more than 88%, not more than 87%, not more than 86%, or not more than 85%. Partially purified streams having a relatively high $CH_4$ content (e.g., at least 30%, at least 40%, or at least 50%) may be advantageous in terms of recovering more $CH_4$. Partially purified gas streams having a relatively high non-methane content may improve the membrane separation to which it is fed, as it increases the difference in partial pressure across the membrane. In one embodiment, each partially purified stream has a $CH_4$ content between about 5% and about 97%, between about 10% and about 96%, between about 15% and about 95%, between about 20% and about 94%, between about 25% and about 93%, between about 25% and about 92%, between about 30% and about 91%, between about 40% and about 90%, between about 50% and about 90%, between about 50% and about 90%, between about 50% and about 94%, or between about 60% and about 92%.

In general, each partially purified stream will be provided at a pressure that is lower than the feed pressure of the membrane system that produced that partially purified stream. For example, when the partially purified stream corresponds to retentate, although the retentate may be close in pressure to the feed pressure, there may be a slight pressure drop along the membrane. When the partially purified stream corresponds to permeate, or is derived from a permeate stream (i.e., within that membrane system), the pressure drop (relative to the feed pressure of the membrane system) can correspond to the transmembrane pressure of one or more of the stages (e.g., the cumulative transmembrane pressure). In one embodiment, each partially purified stream is provided at a pressure that is about the same pressure (e.g., within about 1 psig. within about 2 psig, within about 3 psig, within about 4 psig, within about 5 psig, within about 6 psig, within about 7 psig, within about 8 psig, within about 9 psig, or within about 10 psig) of the individual pressurized gas stream with which it is combined. In some embodiments, the pressure of one or more partially purified streams (or the corresponding permeate and/or retentate) is adjusted to match the pressure of the individual stream with which it is combined. In general, the individual pressurized gas streams and partially purified streams may be combined within the pipes, within a mixer, within a vessel, or within a membrane system.

In one embodiment, the plurality of membrane systems produces a plurality of partially purified streams having successively lower pressures, and each of the one or more partially purified streams is combined with one of the pressurized gas streams having substantially the same pressure as the partially purified stream that it is combined with. In one embodiment, the one or more partially purified streams are combined without compression of the partially purified streams. In one embodiment, one or more of the partially purified streams are provided for processing in membrane systems at lower pressure levels using a pipe system (e.g., rigid and/or flexible).

Advantageously, combining each partially purified stream with an individual pressurized gas stream to provide a combined stream that is processed by the corresponding membrane system allows the $CH_4$ in the partially purified stream to be at least partially recovered with minimal recompression costs. In many embodiments, combining each partially purified stream with an individual pressurized gas stream increases the concentration of the non-methane component (i.e., relative to the individual pressurized gas stream), which can improve the membrane separation (i.e., by changing the partial pressures).

Off-Gas and Product Streams

In general, each membrane system may produce a product stream and/or an off-gas stream. In one embodiment, the off-gas streams from the different pressure levels are combined to provide a combined off-gas gas and/or the different product streams from the different pressure levels are combined to provide a combined product gas.

In one embodiment, each of the individual product streams and/or combined product gas is/are of sufficient quality for injection into a natural gas distribution system (e.g., are of pipeline quality) and/or for transportation use (e.g., meet specifications for natural gas for transportation use). As will be understood by those skilled in the art, pipeline specifications can vary by region (e.g., state and/or country). For example, the pipeline specification of 2.5 mol % of $CO_2$ is given according to gas quality requirements in many European countries (e.g., Norway, France, UK, and Denmark). In one embodiment, each of the individual product streams and/or the combined product gas has a $CH_4$ content of at least 92%, at least 93%, at least 94%, at least 95%, at least 96%, at least 97%, at least 98%, or at least 99%. In one embodiment, each of the individual product streams and/or the combined product gas has a non-methane content that is not more than 8%, not more than 7%, not more than 6%, not more than 5%, not more than 4%, not more than 3%, or not more than 2%.

In one embodiment, the combined product gas is provided as RNG, which is provided for use as a transportation fuel, is injected into a natural gas distribution system, is provided as compressed natural gas (CNG), is provided as liquified natural gas (LNG), and/or is provided for use in a fuel production process that produces a renewable fuel (e.g., as feedstock and/or fuel). Advantageously, the method(s)/system(s) disclosed herein may incentivize the use of biogas as a feedstock for producing a transportation fuel as the product gas can be provided at relatively high pressures (e.g., greater than 800 psi), without compression, thereby significantly improving the economics.

In one embodiment, each of the individual off-gas streams and/or combined off-gas is/are of a quality that allows the off-gas to be disposed of or provided as a by-product. In one embodiment, each of the individual off-gas streams and/or the combined off-gas has a $CO_2$ or $N_2$ content of at least 40%, at least 50%, at least 60%, at least 70%, at least 80%, at least 85%, or at least 90%. In one embodiment, each of the individual off-gas streams and/or the combined off-gas has $N_2$ content of at least 40%. In one embodiment, the combined off-gas is combusted.

In one embodiment, the pressurized gas mixture is biogas and the combined off-gas is a $CO_2$ rich gas (e.g., at least 80% $CO_2$, at least 85% $CO_2$, at least 90% $CO_2$, or at least 95% $CO_2$), which is provided as a resource to create valuable products or services, or is stored (e.g., permanently sequestered underground in geological formations such as abandoned oil and/or gas fields or deep saline formations). Accordingly, the lifecycle greenhouse gas (GHG) emissions and/or carbon intensity (CI) of the RNG or a fuel produced using the RNG can be reduced. More specifically, as the $CO_2$ from the biogas is biogenic, and removing the biogenic $CO_2$ from the atmosphere (or preventing its release to the atmosphere) provides the foundation for carbon removal or negative emissions, the $CO_2$ off-gas can be used as part of carbon capture, utilization, and storage (CCUS) approach can further reduce the lifecycle GHG emissions and/or CI of a biofuel produced from the biogas. Advantageously, when the $CO_2$ is removed at a centralized processing facility, from biogas from a plurality of biogas sources, the CCUS approach benefits from economies of scale and improved economics. As used herein, CCUS encompasses both carbon capture and storage (CCS) and carbon capture and utilization (CCU). For example, CCU can include the production of fuels and/or chemicals using the $CO_2$.

Advantageously, the method(s)/system(s) disclosed herein provide a membrane separation that can be achieved without compression (e.g., after the pressurized gas mixture is provided) or with minimal compression (e.g., compression at the lowest pressure level). Notably, the method(s)/system(s) disclosed herein are particularly advantageous when the partially purified streams that are provided to lower pressure levels includes permeate and/or is derived from permeate gas produced within the membrane system that produced that partially purified stream.

Further advantageously, the system(s)/method(s) disclosed herein provide improved economics for upgrading biogas, particularly when the pressurized gas mixture is obtained from a process where raw and/or partially purified biogas is transported by vehicle (e.g., to a centralized processing facility in pressurize vessels in a hub-and-spoke configuration). For example, such a configuration can 1) provide a relatively large and/or continuous supply of biogas, 2) provide centralized processing that benefits from economies of scale and/or centralized injection (e.g., of RNG or of compressed $CO_2$ for sequestration), 3) provide biogas that is compressed to a level that improves the membrane separation (e.g., by allowing at least a portion of the biogas to be provided at higher feed pressures, and/or by eliminating the need for recycle streams, and thus recycle compression, as described herein), and/or 4) allow the biogas to be withdrawn from multiple pressure vessels at different pressures, which can correspond to the different pressure levels. The process can be further improved when the pressurized gas mixture is obtained from a process wherein raw biogas is partially purified at a remote pre-processing site (e.g., to remove one or more components) prior to transport to the processing facility, and when the partial purification is selected such that the transported pressurized biogas has a composition suitable for being directly fed into the membrane system (i.e., without further pretreatment). For example, it may be advantageous to remove, $H_2O$, $H_2S$, and VOCs prior to transport when the membrane system primarily provides a $CO_2/CH_4$ separation, or $H_2O$, $H_2S$, VOCs, and $CO_2$ when the membrane system primarily provides a $N_2/CH_4$ separation.

Example

Figure 11:
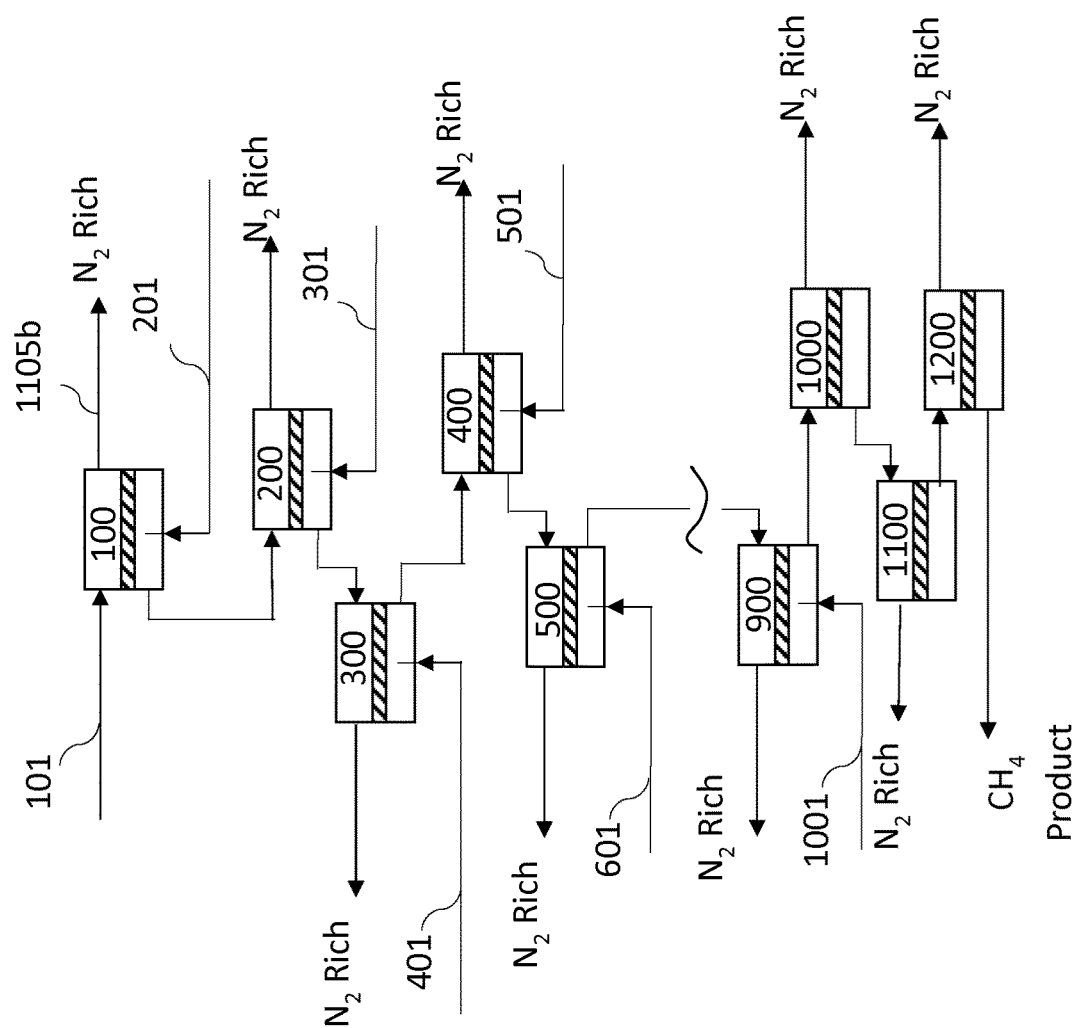
FIG. 11 is a schematic diagram of membrane separation in accordance with an embodiment that uses a plurality of membrane systems, wherein each membrane system is a single stage $CH_4$-selective membrane.

Referring to FIG. 11, there is shown a membrane separation in accordance with another embodiment. In this embodiment, the pressurized gas mixture is biogas that is predominately $N_2$ and $CH_4$ and each membrane system 100, 200, 300, . . . 1200 is a single stage $CH_4$-selective membrane, which provides a $CH_4$ depleted retentate (e.g., 1105*b*), labelled as $N_2$ rich, and a $CH_4$ enriched permeate. In this embodiment, the permeate from each of the first nine membrane systems 100, 200, . . . 900, is combined with one of the individual pressurized gas streams 201, 301, . . . 1001, within the membrane system that produced the permeate. Each of these combined streams, which contain fresh feed, are partially purified streams that are passed to a successively lower pressure level. The last two membrane systems 1100, 1200 do not process fresh feed (i.e., do not process one of the individual pressurized gas streams). In this embodiment, all twelve membrane systems 100, 200, . . . 1200 produce a partially purified stream and an off-gas stream (i.e., a $N_2$-rich stream).

The following prophetic example, which is based on the embodiment illustrated in FIG. 11, is based on a mathematical model developed with the following considerations and/or assumptions: (1) the biogas feed for the membrane separation is a binary mixture having a $CH_4$ content of 92% and a $N_2$ content of 8%, (2) the initial pressure of the feed is 4000 psia such that ten aliquots of the biogas can be withdrawn and provided as ten individual pressurized gas streams at successively decreasing pressures, where the first pressurized gas stream is at 4000 psia, and where the pressure difference between successive pressurized gas streams is 400 psia, so the tenth and final aliquot is withdrawn at 400 psia, (3) each individual pressurized gas stream is provided at a rate of 1000 m³/hr, (4) each membrane has a $CH_4/N_2$ selectivity of 3, (5) steady state conditions are achieved such that the feed/retentate and permeate pressures are constant at 20° C., and (6) gas flows on both the feed and permeate sides of the membrane are in plug flow mode (e.g., permeate flows countercurrent to the retentate in a pure countercurrent mode of operation such that the permeate and retentate are in plug flow in opposing directions). These considerations and assumptions were applied in mathematical model, described below, to predict the performance of the system. The specific parameters for each membrane system and the modeled compositions of various streams are shown in Tables 1 and 2. In each case, the pressures correspond to the pressure at 20° C. and the flow rates (e.g., in m³/hr) are reported at standard temperature and pressure (STP), which corresponds to 0° C. and 100 kPa.

TABLE 1

Pressures and streams for membrane system

| Pressure level | Membrane system | Pressure of feed for the membrane system (psia) | Trans-membrane pressure of the membrane system (psia) | Pressure of gas output from membrane system on permeate side (psia) | Individual pressurized gas stream (and corresponding pressure in psia) |
|---|---|---|---|---|---|
| 1 | 100 | 4000 | 400 | 3600 | 101 (4000)-to feed |
|   |     |      |     |      | 201 (3600)-to permeate |
| 2 | 200 | 3600 | 400 | 3200 | 301 (3200) |
| 3 | 300 | 3200 | 400 | 2800 | 401 (2800) |
| 4 | 400 | 2800 | 400 | 2400 | 501 (2400) |
| 5 | 500 | 2400 | 400 | 2000 | 601 (2000) |
| 6 | 600 | 2000 | 400 | 1600 | 701 (1600) |
| 7 | 700 | 1600 | 400 | 1200 | 801 (1200) |
| 8 | 800 | 1200 | 400 | 800  | 901 (900) |
| 9 | 900 | 800  | 400 | 400  | 1001 (400) |
| 10 | 1000 | 400 | 200 | 200 | — |
| 11 | 1100 | 200 | 100 | 100 | — |
| 12 | 1200 | 100 | 85.3 | 14.7 | — |

TABLE 2

Modeled compositions and flow rates.

| Membrane system | Retentate outlet ($N_2$ rich off-gas) | | Permeate outlet (partially purified stream or product stream) | |
|---|---|---|---|---|
|   | Flow rate (m³/hr) | Composition | Flow rate (m³/hr) | Composition |
| 1 | 9.8 | 65% $CH_4$, 35% $N_2$ | 1990 | 92.12% $CH_4$, 7.88% $N_2$ |
| 2 | 21.0 | 65% $CH_4$, 35% $N_2$ | 2979 | 92.26% $CH_4$, 7.74% $N_2$ |
| 3 | 34.6 | 65% $CH_4$, 35% $N_2$ | 3935 | 92.41% $CH_4$, 7.59% $N_2$ |
| 4 | 50.1 | 65% $CH_4$, 35% $N_2$ | 4885 | 92.59% $CH_4$, 7.41% $N_2$ |
| 5 | 69.6 | 65% $CH_4$, 35% $N_2$ | 5816 | 92.81% $CH_4$, 7.19% $N_2$ |
| 6 | 93.5 | 65% $CH_4$, 35% $N_2$ | 6722 | 93.07% $CH_4$, 6.93% $N_2$ |
| 7 | 128.0 | 65% $CH_4$, 35% $N_2$ | 7594 | 93.38% $CH_4$, 6.62% $N_2$ |
| 8 | 177.8 | 65% $CH_4$, 35% $N_2$ | 8416 | 93.81% $CH_4$, 6.19% $N_2$ |
| 9 | 265.0 | 65% $CH_4$, 35% $N_2$ | 9151 | 94.55% $CH_4$, 5.55% $N_2$ |
| 10 | 237.1 | 65% $CH_4$, 35% $N_2$ | 8914 | 95.23% $CH_4$, 4.77% $N_2$ |
| 1100 | 178.4 | 65% $CH_4$, 35% $N_2$ | 8736 | 95.84% $CH_4$, 4.16% $N_2$ |
| 1200 | 248.0 | 65% $CH_4$, 35% $N_2$ | 8488 | 96.75% $CH_4$, 3.25% $N_2$ |

In the mathematical model, each membrane system (i.e., single stage) is notionally divided into "slices" for the calculations. More specifically the concentrations of the retentate and permeate along the membrane are calculated by notionally dividing the membrane into 60 lengthwise slices and carrying out gas balances on each slice. For any slice, the ratio of the flux of $CH_4$ (M) to $N_2$ (N) is given by Equation (1)

$$(M/N)_{flux}=(M_rP_r-M_pP_p)\alpha/(N_rP_r-N_pP_p) \quad (1)$$

where $M_r$ represents the mol % of $CH_4$ in the retentate, $P_r$ represents the pressure of the retentate (psia), $M_p$ represents the mol % of $CH_4$ in the permeate, $P_p$ represents the pressure of the permeate (psia), $N_r$ represents the mol % of $N_2$ in the retentate, $N_p$ represents the mol % of $N_2$ in the permeate, and α represents the permeability (i.e., in this case α=the M/N permeability=3.0). It is assumed that a negligible amount of permeate remains within the membrane (i.e., material balances for retentate and permeate yield $M_r+N_r=1$ and $M_p+N_p=1$) and that the pressure of the retentate and the permeate do not drop along the membrane (i.e., for the first pressure level, $P_r=4000$ psia and $P_p=3600$ psia along the entire membrane). We can then solve Equation (1) for each slice of the membrane numerically. This enables the retentate and permeate flows and concentrations to be determined along the membrane.

Referring to the first membrane system 100, the biogas fed into the inlet of the membrane has a $CH_4$ content of 92% and a $N_2$ content of 8%. As the biogas propagates along the retentate side of membrane, more and more $CH_4$ permeates through the membrane, until the biogas is provided as an off-gas at the outlet, where it has a $CH_4$ content of 65% and a $N_2$ content of 35%. On the permeate side, the calculations indicate that the mol % of $N_2$ ($N_p$) is just below 35% at the retentate outlet side of the membrane (e.g., in slice 60), and decreases from right to left, such that it is lowest close to the permeate outlet (e.g., in slice 1). At one point (not explicitly shown, but calculated to be at slice 3), the mol % of $N_2$ in the permeate is about 8%. As we proceed through the system (down Table 2), the feed location moves toward the right hand side of the membrane. For example, in membrane system 900 the gas feed location is slice 15.

In this embodiment, the second pressurized stream 201 is introduced at some position within the membrane that is relatively close to or at a location calculated to have a mol % of $N_2$ in the permeate, $N_p$, that is close the mol % of $N_2$ in the pressurized gas stream being fed therein (i.e., in this case 8%). For example, in practice, this may be achieved by injecting the pressurized gas stream at an intermediate point within the central permeate channel of a spiral wound membrane. When the pressurized gas stream has a similar concentration to the gas with which it is combined, there is no net dilution or concentration of the permeate stream. The inventors have found that this is advantageous for achieving a high biogas purity (low $N_2$) and methane recovery.

Referring to Tables 1 and 2, there are 10 individual pressurized gas streams 101, 201, 301, . . . 1001, each provided at 1,000 m³/hr, such that the total feed flow is 10,000 m³/hr. Each membrane system 100, 200, . . . 1200, produces an off-gas having a $N_2$ content of 35% (and a $CH_4$ content of 65%). Each of the first ten membrane systems 100, 200, . . . 1000 produce permeate that is combined with one of the individual pressurized gas streams (i.e., where the $N_2$ contents substantially match) such that the combined stream (i.e., each partially purified stream provided for processing in a subsequent level) has a $N_2$ content that is less than 8%. The $N_2$ content of the partially purified streams decreases with decreasing pressure levels, until the last membrane system 1200, which provides a product stream having a $CH_4$ content of 96.75% and a $N_2$ content of 3.25%, which is provided at a flow rate of 8488 m³/hr at atmospheric pressure. The total flow rate of the twelve off-gas streams is 1512 m³/hr. The biogas methane recovery is 89.3%.

Figure 12:
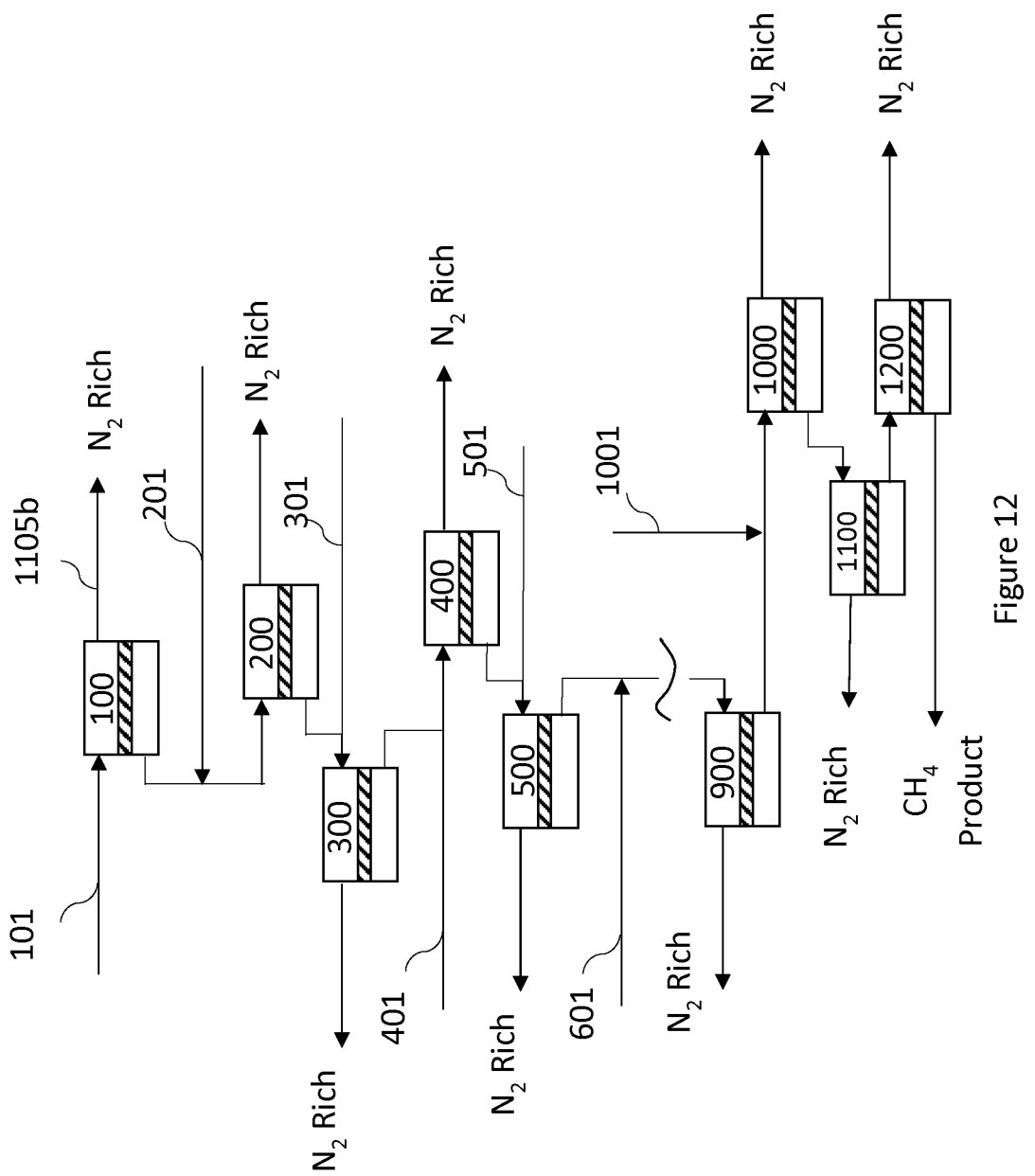
FIG. 12 is a schematic diagram of membrane separation in accordance with another embodiment that uses a plurality of membrane systems, wherein each membrane system is a single stage $CH_4$-selective membrane.

In a comparative example, the same membrane model was used to simulate the membrane separation in the embodiment illustrated in FIG. 12, wherein the individual pressurized gas streams are combined with the permeate downstream of the membrane system that produced that permeate. The resulting product stream produced by the last membrane system 1200 was found to have a similar flow rate (i.e., 8490 m³/hr compared to 8488 m3/hr), but a less favourable composition (i.e., a Na content of 3.51% compared to 3.25% from that observed for the embodiment in FIG. 11). Accordingly, it may be advantageous to combine the pressurized gas streams with the permeate in the membrane system that produces the permeate.

In one embodiment, the system(s)/method(s) disclosed herein are designed such that each of one or more of the pressurized gas streams is fed into a permeate side of each of the one or more membrane systems, thereby providing the one or more partially purified streams. In one embodiment, each of the pressurized gas streams is introduced to the permeate (e.g., in a permeate conduit) at a position that is closer to the permeate outlet end than the retentate outlet end. In one embodiment, each of the pressurized gas streams is introduced to the permeate (e.g., in a permeate conduit) at or at a location calculated close to or near where the mol % of the non-methane component in the permeate is similar (e.g., within 1%, 2%, 5%, or 10%) of the mol % of the non-methane component in the pressurized gas stream being fed therein. In one embodiment, the system(s)/method(s) disclosed herein are designed such that each of the individual off-gas streams has substantially the same methane content (e.g., within 1%). In one embodiment, the system(s)/method(s) disclosed herein are designed such that each of the individual product streams has substantially the same methane content (e.g., within 1%).

Of course, the above embodiments have been provided as examples only. It will be appreciated by those of ordinary skill in the art that various modifications, alternate configurations, and/or equivalents will be employed without departing from the scope of the invention. For example, while various embodiments have been described herein wherein a. $CH_4/N_2$ and/or $CH_4/CO_2$ separation are provided, in other embodiments, another separation (e.g., $O_2/CH_4$ or $H_2S/CH_4$) is provided. While various embodiments of a $N_2/CH_4$ separation wherein the retentate is depleted in $CH_4$ have been described herein, in other embodiments, the retentate is enriched in $CH_4$. While various embodiments have been described wherein each membrane system provided receives gas from a respective individual pressurized gas stream, it is also envisioned that some membrane systems may not. While one advantage of various embodiments described herein is that there are reduced recompression costs associated with recycle, in some embodiments, recycle is employed at one or more pressure levels. Accordingly, the scope of the invention is therefore intended to be limited solely by the scope of the appended claims.

The invention claimed is:
1. A method of separating a gas mixture, the method comprising:
 a) providing a pressurized gas mixture, the pressurized gas mixture comprising methane and at least one non-methane component;
 b) withdrawing portions of the pressurized gas mixture and providing the portions as a plurality of pressurized gas streams at successively lower pressures, each portion provided as a respective pressurized gas stream;

c) providing a plurality of membrane systems at successively lower pressure levels, each membrane system in the plurality of membrane systems comprising at least one stage and configured to provide at least two streams, the at least two streams chosen from a product stream, an off-gas stream, and a partially purified stream;

d) processing feed in each membrane system provided in (c),
wherein the feed for each membrane system provided in (c) comprises gas from a respective pressurized gas stream in the plurality of pressurized gas streams, and
wherein the feed for at least one membrane system provided in (c) further comprises gas from a partially purified stream produced from one of the membrane systems provided in (c) that is at a higher pressure level than the at least one membrane system; and e) providing a product gas from at least one product stream produced from the plurality of membrane systems.

2. The method according to claim 1, wherein the pressurized gas mixture is at a pressure of at least 1000 psig.

3. The method according to claim 1, wherein step (b) comprises depressurizing the pressurized gas mixture using at least one pressure let down system to provide the plurality of pressurized gas streams at successively lower pressures.

4. The method according to claim 1, wherein the feed for the at least one membrane system is produced by combining the partially purified stream produced from the membrane system that is at a higher pressure level with one of the pressurized gas streams provided in (b).

5. The method according to claim 4, wherein the partially purified stream produced from the membrane system that is at a higher pressure level has a substantially same pressure as the pressurized gas stream with which it is combined.

6. The method according to claim 1, wherein the feed for the at least one membrane system is produced by feeding one of the pressurized gas streams provided in (b) into a permeate side of at least one stage of the membrane system that is at the higher pressure level, thereby providing the partially purified stream in (d).

7. The method according to claim 6, wherein the pressurized gas stream is fed into a permeate conduit at a position that is closer to the permeate outlet end than the retentate outlet end.

8. The method according to claim 1, wherein each membrane system in the plurality of membrane systems produces a product stream, an off-gas stream, and a partially purified stream.

9. The method according to claim 1, wherein each membrane system in the plurality of membrane systems produces a product stream having a methane content of at least 92%.

10. The method according to claim 1, wherein each membrane in the plurality of membrane systems is selective for methane over nitrogen.

11. The method according to claim 1, wherein each membrane in the plurality of membrane systems is selective for carbon dioxide over methane.

12. The method according to claim 11, wherein each membrane system in the plurality of membrane systems produces an off-gas having a carbon dioxide content of at least 85%, and wherein the method comprises sequestering the carbon dioxide.

13. The method according to claim 1, wherein each membrane system in the plurality of membrane systems comprises a multistage membrane system, and wherein each partially purified stream produced by one of the membrane systems comprises permeate produced from at least one of the stages.

14. The method according to claim 1, wherein step (a) of providing the pressurized gas mixture comprises providing biogas from at least one pressure vessel transported from at least one biogas source.

15. The method according to claim 14, wherein the biogas in the at least one pressure vessel is partially purified biogas.

16. The method according to claim 1, wherein each membrane system in the plurality of membrane systems comprises a two-stage membrane system.

17. The method according to claim 1, wherein each membrane system in the plurality of membrane systems comprises a three-stage membrane system.

18. The method according to claim 1, wherein a difference in pressure between the pressure levels is between 30 psig and 600 psig.

19. The method according to claim 1, wherein a difference in pressure between pressure levels is substantially equal to a largest transmembrane pressure in a pressure level.

20. The method according to claim 1, and wherein the pressurized gas mixture provided in step (a) is at a pressure of at least 3000 psig.

21. A system for separating a gas mixture, the system comprising:

a) at least one system inlet configured to receive a pressurized gas mixture from a pressurized vessel, the pressurized gas mixture comprising biogas;

b) a feed system, the feed system in fluid communication with the at least one system inlet and configured to provide a plurality of pressurized streams of the biogas at successively lower pressures;

c) a plurality of membrane systems having successively lower feed pressures, each membrane system comprising at least one stage and configured to receive gas from a respective one of the pressurized gas streams, each membrane system in the plurality of membrane systems configured to provide at least two streams, the at least two streams chosen from a product stream, an off-gas stream, and a partially purified stream;

d) a pipe system for providing feed for each membrane system in the plurality of membrane systems, the pipe system configured to provide gas from at least one partially purified stream produced from the plurality of membrane systems for processing in one of the membrane systems in (c) having a lower feed pressure than the membrane system that produced that partially purified stream; and, e) at least one system outlet for providing a product gas from at least one product stream produced from the plurality of membrane systems.

22. A method of upgrading biogas, the method comprising:

a) providing at least one pressure vessel, each pressure vessel containing biogas at a pressure of at least 1000 psig, the biogas comprising methane and a non-methane component;

b) withdrawing portions of the biogas from the at least one pressure vessel, thereby depressurizing the at least one pressure vessel, and providing each portion as a pressurized gas stream at a different pressure, thereby providing a plurality of pressurized gas streams at successively decreasing pressures;

c) providing a plurality of membrane systems, each membrane system in the plurality of membrane systems at a different pressure level and configured to provide at least two streams, the at least two streams chosen from a product stream, an off-gas stream, and a partially purified stream;
d) feeding a first pressurized gas stream from the plurality of pressurized gas streams to a first a membrane system from the plurality of membrane systems, the first membrane system at a first pressure level and producing a first permeate;
e) feeding a combined stream to a second membrane system in the plurality of membrane systems, the second membrane system at a second pressure level and producing a second permeate, the second pressure level lower than the first pressure level, the combined stream produced by combining a second pressurized gas stream from the plurality of pressurized gas streams with the first permeate or a stream derived from the first permeate, wherein the second pressurized gas stream is at a lower pressure than the first pressurized gas stream; and
f) providing a product gas from at least one product stream produced from the plurality of membrane systems.

23. The method according to claim 22, wherein the method further comprises:
feeding another combined stream to a third membrane system from the plurality of membrane systems, the third membrane system at a third pressure level and producing a third permeate, the third pressure level lower than the second pressure level, the other combined stream produced by combining a third pressurized gas stream from the plurality of pressurized gas streams with at least the second permeate or a stream derived from the second permeate, wherein the third pressurized gas stream is at a lower pressure than the second pressurized gas stream.

* * * * *